US009654586B2

(12) United States Patent
Thomas et al.

(10) Patent No.: US 9,654,586 B2
(45) Date of Patent: May 16, 2017

(54) RESOURCE SERVER PROVIDING A RAPIDLY CHANGING RESOURCE

(71) Applicant: SAS Institute Inc., Cary, NC (US)

(72) Inventors: Michael Thomas, Raleigh, NC (US); Gerald Donald Baulier, Apex, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/145,140

(22) Filed: May 3, 2016

(65) Prior Publication Data
US 2016/0248693 A1  Aug. 25, 2016

Related U.S. Application Data

(63) Continuation of application No. 14/790,563, filed on Jul. 2, 2015, now Pat. No. 9,369,406.

(60) Provisional application No. 62/020,451, filed on Jul. 3, 2014, provisional application No. 62/024,109, filed on Jul. 14, 2014, provisional application No. 62/049,952, filed on Sep. 12, 2014.

(51) Int. Cl.
H04L 29/08      (2006.01)
H04L 12/911     (2013.01)
G06F 9/50       (2006.01)
H04L 29/06      (2006.01)
G06F 3/06       (2006.01)
H04L 12/24      (2006.01)

(52) U.S. Cl.
CPC .......... *H04L 67/2852* (2013.01); *G06F 3/067* (2013.01); *G06F 3/0608* (2013.01); *G06F 3/0619* (2013.01); *G06F 3/0661* (2013.01); *G06F 9/5027* (2013.01); *H04L 47/70* (2013.01); *H04L 47/827* (2013.01); *H04L 69/03* (2013.01); *H04L 41/509* (2013.01)

(58) Field of Classification Search
CPC ... H04L 67/2852; H04L 69/03; H04L 41/509; H04L 47/70
See application file for complete search history.

(56) References Cited

U.S. PATENT DOCUMENTS 5,691,917 A * 11/1997 Harrison ............... H04L 41/064
                                                        717/127
6,026,474 A *  2/2000 Carter .................. G06F 9/5016
                                                        707/999.01

(Continued)

Primary Examiner — Jimmy H Tran
(74) Attorney, Agent, or Firm — Bell & Manning, LLC

(57) ABSTRACT

A computing device is provided that supports receipt and processing of blocks of streamed data associated with an event and provision of pre-rendered and compressed events to event client systems with a high-throughput. The computing device includes a compression optimizer module that determines how to make new compressed blocks of the right level of compression as the blocks of streamed data are received from an event publishing system. The compression optimizer module utilizes a tree map and unique identifiers to selectively compress, read, and recompress the blocks of streamed data associated with each event. To prevent duplicate work in compressing the streamed data, compressed blocks are re-used where possible to support requests from the event client systems. Each new block includes a unique identifier defined by the event publishing system that generated the event, so that a previous version of the event in a compressed block can be replaced.

3 Claims, 16 Drawing Sheets

(56) References Cited

U.S. PATENT DOCUMENTS

| | | | | |
|---|---|---|---|---|
| 6,237,024 B1* | 5/2001 | Wollrath | G06F 9/485 | 709/203 |
| 6,292,905 B1* | 9/2001 | Wallach | G06F 9/4411 | 709/239 |
| 6,449,318 B1* | 9/2002 | Rumbaugh | H04L 27/02 | 340/12.32 |
| 6,496,831 B1* | 12/2002 | Baulier | G06F 17/30557 | |
| 6,502,133 B1* | 12/2002 | Baulier | G06F 9/542 | 709/224 |
| 6,681,230 B1* | 1/2004 | Blott | G06F 8/38 | |
| 6,714,962 B1* | 3/2004 | Helland | G06F 21/6218 | 707/999.01 |
| 7,039,391 B2 | 5/2006 | Rezvani | H04L 63/08 | 340/12.28 |
| 7,984,040 B2* | 7/2011 | Mishra | G06F 17/30516 | 707/713 |
| 8,065,319 B2* | 11/2011 | Ding | G06F 17/30516 | 707/769 |
| 8,085,708 B2* | 12/2011 | Bengtsson | H04L 12/581 | 370/328 |
| 8,099,452 B2* | 1/2012 | Chkodrov | G06F 1/12 | 709/201 |
| 8,103,714 B2* | 1/2012 | Dorai | G06F 9/466 | 709/201 |
| 8,189,599 B2* | 5/2012 | Sharma | H04L 69/18 | 370/230 |
| 8,300,647 B2* | 10/2012 | Abdulla | H04L 29/12028 | 370/389 |
| 8,326,822 B2* | 12/2012 | Mishra | G06F 17/30516 | 707/713 |
| 8,429,630 B2* | 4/2013 | Nickolov | G06F 9/4856 | 717/110 |
| 8,601,144 B1* | 12/2013 | Ryner | G06F 21/45 | 709/228 |
| 8,667,075 B1* | 3/2014 | King | H04N 21/2187 | 709/206 |
| 8,825,830 B2* | 9/2014 | Newton | H04L 67/42 | 709/220 |
| 8,949,801 B2* | 2/2015 | Andrade | G06F 11/1438 | 714/1 |
| 8,954,665 B2* | 2/2015 | Czezatke | G06F 11/1451 | 711/100 |
| 8,982,738 B2* | 3/2015 | Li | H04L 12/14 | 370/270 |
| 9,058,572 B2* | 6/2015 | Balko | G06Q 10/06 | |
| 2001/0005883 A1* | 6/2001 | Wray | H04L 9/0844 | 713/151 |
| 2001/0056554 A1* | 12/2001 | Chrabaszcz | G06F 11/1658 | 714/13 |
| 2002/0077077 A1* | 6/2002 | Rezvani | H04L 63/08 | 455/410 |
| 2006/0271931 A1* | 11/2006 | Harris | G06F 9/52 | 718/1 |
| 2007/0103984 A1* | 5/2007 | Kavuri | G06F 3/0605 | 365/185.17 |
| 2008/0101278 A1* | 5/2008 | Bengtsson | H04L 12/581 | 370/328 |
| 2008/0285553 A1* | 11/2008 | Abdulla | H04L 29/12028 | 370/389 |
| 2008/0301135 A1* | 12/2008 | Alves | G06F 17/30442 | |
| 2009/0037769 A1* | 2/2009 | Babkin | G06F 17/30516 | 714/15 |
| 2009/0063548 A1* | 3/2009 | Rusher | G06F 17/30368 | |
| 2010/0146243 A1* | 6/2010 | Balko | G06Q 10/06 | 712/33 |
| 2011/0022883 A1* | 1/2011 | Hansen | H04L 9/085 | 714/2 |
| 2011/0072151 A1* | 3/2011 | Sharma | H04L 69/18 | 709/233 |
| 2011/0280153 A1* | 11/2011 | Li | H04L 12/14 | 370/254 |
| 2012/0179745 A1* | 7/2012 | Chen | H04N 21/6587 | 709/203 |
| 2012/0180109 A1* | 7/2012 | Chen | G06F 17/30035 | 726/3 |
| 2012/0185693 A1* | 7/2012 | Chen | H04N 21/41407 | 713/168 |
| 2012/0226796 A1* | 9/2012 | Morgan | H04L 12/1453 | 709/224 |
| 2013/0036272 A1* | 2/2013 | Nelson | H04L 67/1097 | 711/147 |
| 2013/0212212 A1* | 8/2013 | Addepalli | G06F 9/461 | 709/217 |
| 2013/0326572 A1* | 12/2013 | Pitts | G06F 17/30144 | 725/109 |
| 2014/0059194 A1* | 2/2014 | Robb | G06F 9/5072 | 709/223 |
| 2014/0280986 A1* | 9/2014 | Baulier | H04L 67/10 | 709/227 |
| 2015/0106426 A1* | 4/2015 | Antipa | H04L 67/1097 | 709/203 |

\* cited by examiner

RESOURCE SERVER PROVIDING A RAPIDLY CHANGING RESOURCE

CROSS-REFERENCE TO RELATED APPLICATIONS

The present application is a continuation of U.S. patent application Ser. No. 14/790,563 that was filed Jul. 2, 2015, the entire contents of which are hereby incorporated by reference. The present application further claims the benefit of 35 U.S.C. §119(e) to U.S. Provisional Patent Application No. 62/020,451 filed Jul. 3, 2014, to U.S. Provisional Patent Application No. 62/024,109 filed Jul. 14, 2014, and to U.S. Provisional Patent Application No. 62/049,952 filed Sep. 12, 2014, the entire contents of which are all hereby incorporated by reference.

BACKGROUND

An increasing number of distributed applications process continuously flowing data from geographically distributed sources, perform analytics on the streamed data, and provide analysis results to entities that may also be geographically distributed.

SUMMARY

In an example embodiment, a computer-readable medium is provided having stored thereon computer-readable instructions that when executed by a computing device, cause the computing device to serve data resources from a publishing system to a client system. A block of streamed data is received. The block includes a value associated with an event and a unique identifier of the event. A pre-allocated block of memory is selected. The pre-allocated block of memory includes one or more previously compressed blocks. Each of the one or more previously compressed blocks includes an associated value and a different unique identifier. The received block is compressed with the one or more previously compressed blocks to create a new compressed block. The new compressed block is stored in the selected pre-allocated block of memory. A reference to the selected pre-allocated block of memory is stored in a tree map based on the unique identifier. A second block of streamed data is received. The second block includes a second value associated with the event and the unique identifier of the event. The second value is different from the value. The pre-allocated block of memory is identified from the tree map using the unique identifier. The received block and at least one of the one or more previously compressed blocks is read from the identified pre-allocated block of memory. A second pre-allocated block of memory is selected. The received second block is compressed with the at least one of the one or more previously compressed blocks to create a second new compressed block. The second new compressed block is stored in the selected second pre-allocated block of memory. A reference to the selected second pre-allocated block of memory is stored in the tree map based on the unique identifier. A request for an update for the event based on the unique identifier is received from a requesting event client system. The stored, second new compressed block is sent to the requesting event client system.

In another example embodiment, a system is provided. The system includes, but is not limited to, a processor and a computer-readable medium operably coupled to the processor. The computer-readable medium has instructions stored thereon that, when executed by the processor, cause the system to serve data resources from a publishing system to a client system.

In yet another example embodiment, a method of serving data resources from a publishing system to a client system is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
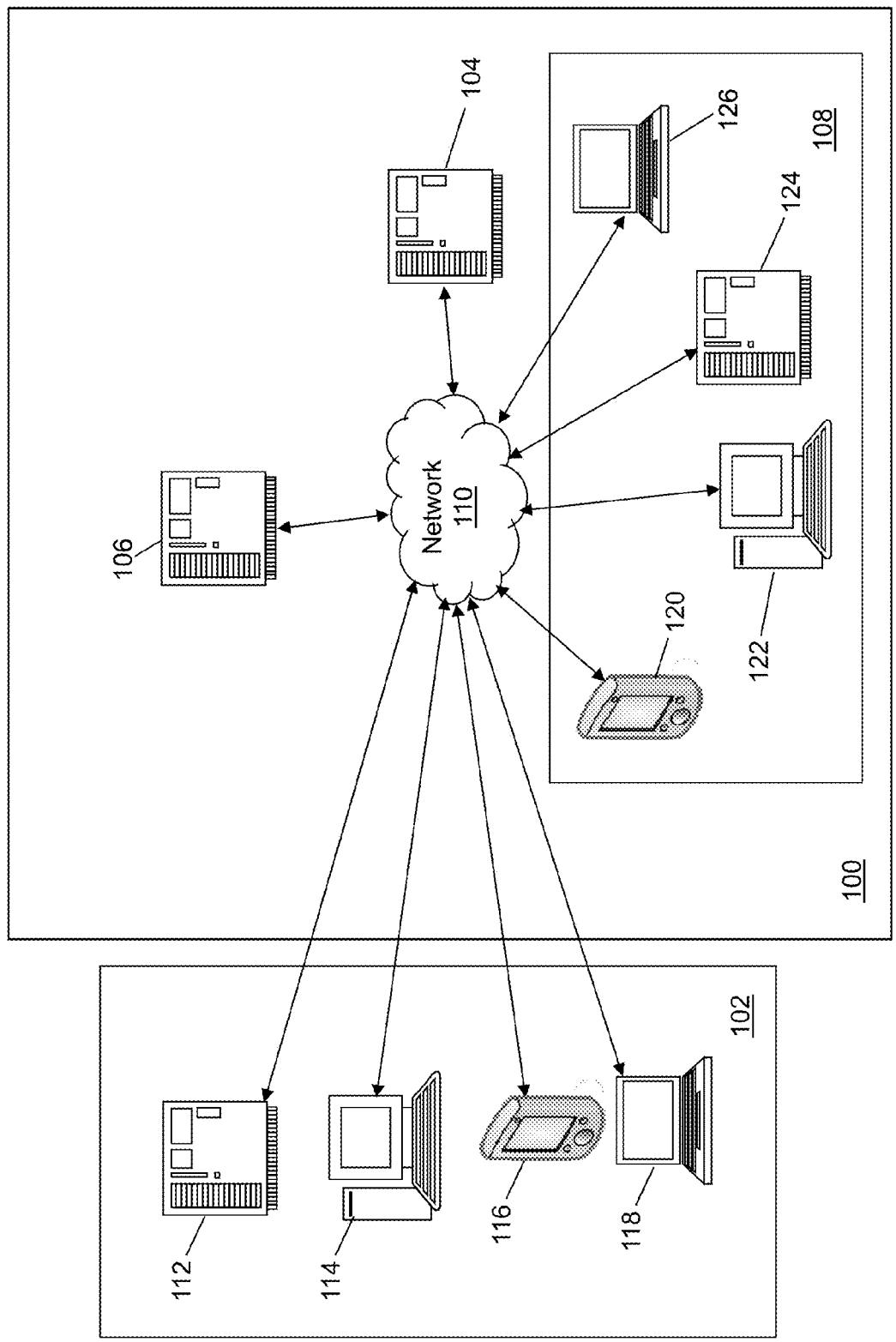
FIG. 1 depicts a block diagram of a stream processing system in accordance with an illustrative embodiment.

Referring to FIG. 1, a block diagram of a stream processing system 100 is shown in accordance with an illustrative embodiment. In an illustrative embodiment, stream processing system 100 may include a plurality of event publishing systems 102, an event stream processing (ESP) device 104, a resource server 106, a plurality of event client systems 108, and a network 110. In the terminology of representational state transfer (REST), stream processing system 100 streams resource updates through a resource. The resource updates can be called 'events', and they can be processed by the clients of event client systems 108 as 'events.' The client frequently requests a resource using a resource identifier and receives a representation of the event. The resource identifier describes a resource that is part of a larger resource, and the described resource is the changes since a last change index as described further below.

For example, the plurality of event publishing systems 102 provide streamed data to ESP device 104. ESP device 104 receives the streamed data, performs analytic processing on the streamed data, and provides processed streamed data to resource server 106. Resource server 106 receives the processed streamed data, pre-renders and compresses the received streamed data, and provides the pre-rendered, compressed data to one or more of the plurality of event client systems 108, when requested. Each of the plurality of event publishing systems 102, ESP device 104, resource server 106, and the plurality of event client systems 108 may be composed of one or more discrete devices in communication through network 110.

Network 110 may include one or more networks of the same or different types. Network 110 can be any type of wired and/or wireless public or private network including a cellular network, a local area network, a wide area network such as the Internet or the World Wide Web, etc. Network 110 further may comprise sub-networks and consist of any number of devices.

The one or more computing devices of the plurality of event publishing systems 102 may include computers of any form factor such as a server computer 112, a desktop 114, a smart phone 116, a laptop 118, a personal digital assistant, an integrated messaging device, a tablet computer, etc. As shown referring to FIG. 2, the plurality of event publishing systems 102 can include any number and any combination of form factors of computing devices that may be organized into subnets. The computing devices of the plurality of event publishing systems 102 send and receive signals through network 110 to/from another of the one or more computing devices of the plurality of event publishing systems 102, and/or to/from ESP device 104. The one or more computing devices of the plurality of event publishing systems 102 may communicate using various transmission media that may be wired and/or wireless as understood by those skilled in the art. In an alternative embodiment, stream processing system 100 may not include ESP device 104, and the computing devices of the plurality of event publishing systems 102 send and receive signals through network 110 to/from resource server 106.

Figure 2:
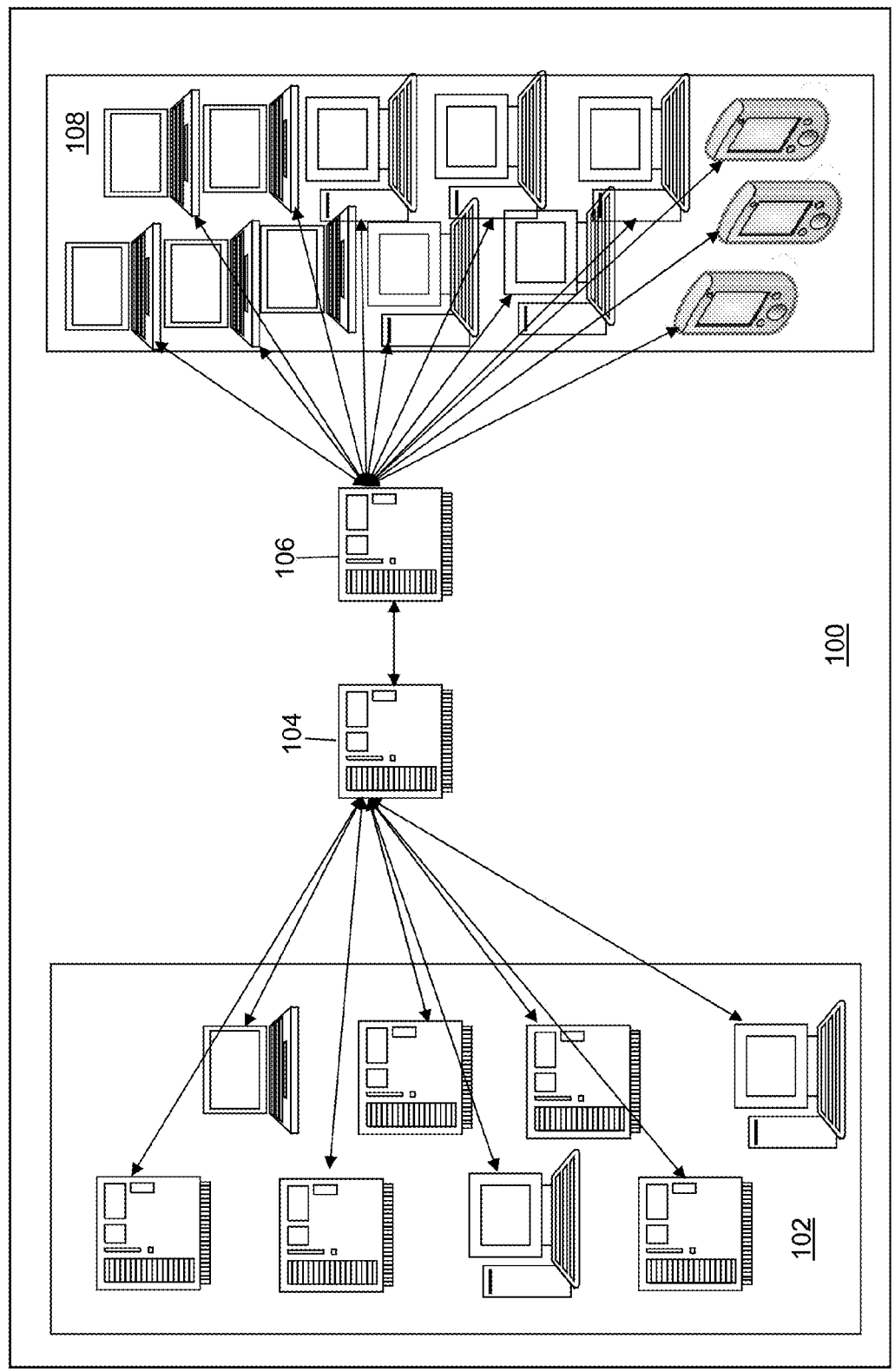
FIG. 2 depicts a connectivity diagram of the stream processing system of FIG. 1 in accordance with an illustrative embodiment.

ESP device 104 can include any type of computing device. For illustration, FIGS. 1 and 2 represent ESP device 104 as a server computer. In general, a server computer may include faster processors, additional processors, more disk memory, and more random access memory (RAM) than a client computer and support multi-threading as understood by a person of skill in the art. ESP device 104 sends and receives signals through network 110 to/from the plurality of event publishing systems 102 and to/from resource server 106. ESP device 104 may communicate using various transmission media that may be wired and/or wireless as understood by those skilled in the art.

Resource server 106 can include any type of computing device. For illustration, FIGS. 1 and 2 represent resource server 106 as a server computer. Resource server 106 sends and receives signals through network 110 to/from ESP device 104 and to/from the plurality of event client systems 108. Resource server 106 may communicate using various transmission media that may be wired and/or wireless as understood by those skilled in the art.

The one or more computing devices of the plurality of event client systems 108 may include computers of any form factor such as a smart phone 120, a desktop 122, a server computer 124, a laptop 126, a personal digital assistant, an integrated messaging device, a tablet computer, etc. As shown referring to FIG. 2, the plurality of event client systems 108 can include any number and any combination of form factors of computing devices. The computing devices of the plurality of event client systems 108 may request data from resource server 106 and, in response, receive data from resource server 106.

The computing devices of the plurality of event client systems 108 send and receive signals through network 110 to/from resource server 106. The one or more computing devices of the plurality of event client systems 108 may communicate using various transmission media that may be wired and/or wireless as understood by those skilled in the art.

Figure 3:
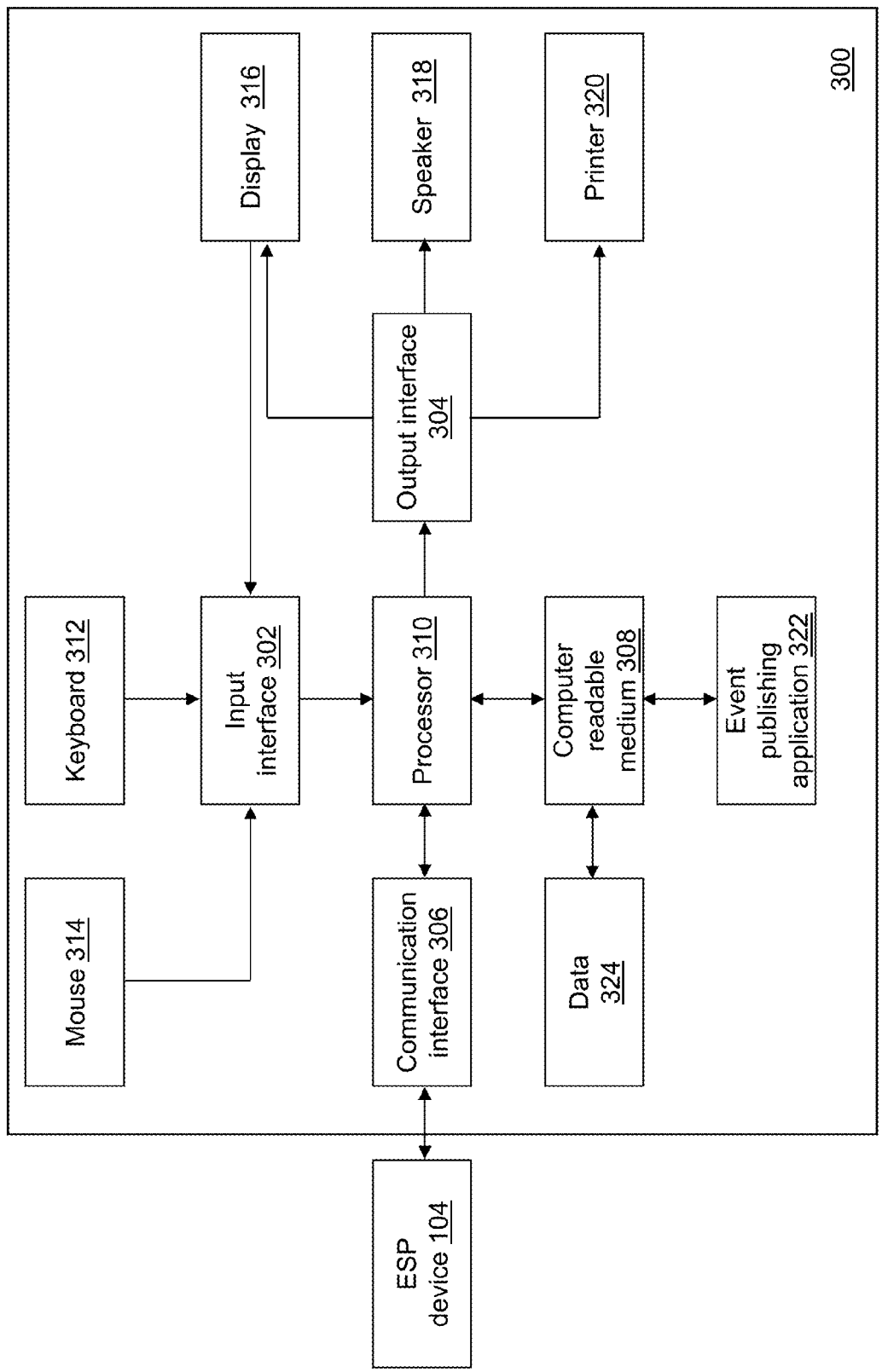
FIG. 3 depicts an event publishing system of the stream processing system of FIG. 1 in accordance with an illustrative embodiment.

Referring to FIG. 3, a block diagram of an event publishing system 300 is shown in accordance with an example embodiment. Event publishing system 300 is an example computing device of the event publishing systems 102. For example, each of server computer 112, desktop 114, smart phone 116, and laptop 118 is an instance of event publishing system 300. Event publishing system 300 may include an input interface 302, an output interface 304, a communication interface 306, a computer-readable medium 308, a processor 310, an event publishing application 322, and data 324. Fewer, different, and additional components may be incorporated into event publishing system 300.

Input interface 302 provides an interface for receiving information from the user for entry into event publishing system 300 as understood by those skilled in the art. Input interface 302 may interface with various input technologies including, but not limited to, a keyboard 312, a mouse 314, a display 316, a track ball, a keypad, one or more buttons, etc. to allow the user to enter information into event publishing system 300 or to make selections presented in a user interface displayed on the display. The same interface may support both input interface 302 and output interface 304. For example, a display comprising a touch screen both allows user input and presents output to the user. Event publishing system 300 may have one or more input interfaces that use the same or a different input interface technology. The input interface technology further may be accessible by event publishing system 300 through communication interface 306.

Output interface 304 provides an interface for outputting information for review by a user of event publishing system 300. For example, output interface 304 may interface with various output technologies including, but not limited to, display 316, a speaker 318, a printer 320, etc. Event publishing system 300 may have one or more output interfaces that use the same or a different interface technology. The output interface technology further may be accessible by event publishing system 300 through communication interface 306.

Communication interface 306 provides an interface for receiving and transmitting data between devices using various protocols, transmission technologies, and media as understood by those skilled in the art. Communication interface 306 may support communication using various transmission media that may be wired and/or wireless. Event publishing system 300 may have one or more communication interfaces that use the same or a different communication interface technology. For example, event publishing system 300 may support communication using an Ethernet port, a Bluetooth antenna, a telephone jack, a USB port, etc. Data and messages may be transferred between event publishing system 300 and ESP device 104 or resource server 106 using communication interface 306.

Computer-readable medium 308 is an electronic holding place or storage for information so the information can be accessed by processor 310 as understood by those skilled in the art. Computer-readable medium 308 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Event publishing system 300 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Event publishing system 300 also may have one or more drives that support the loading of a memory media such as a CD or DVD, an external hard drive, etc. One or more external hard drives further may be connected to event publishing system 300 using communication interface 106.

Processor 310 executes instructions as understood by those skilled in the art. The instructions may be carried out by a special purpose computer, logic circuits, or hardware circuits. Processor 310 may be implemented in hardware and/or firmware. Processor 310 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 310 operably couples with input interface 302, with output interface 304, with communication interface 306, and with computer-readable medium 308 to receive, to send, and to process information. Processor 310 may retrieve a set of instructions from a permanent memory device and copy the instructions in an executable form to a temporary memory device that is generally some form of RAM. Event publishing system 300 may include a plurality of processors that use the same or a different processing technology.

Event publishing application 322 performs operations associated with generating and/or receiving data. The operations may be implemented using hardware, firmware, software, or any combination of these methods. Referring to the example embodiment of FIG. 3, event publishing application 322 is implemented in software (comprised of computer-readable and/or computer-executable instructions) stored in computer-readable medium 308 and accessible by processor 310 for execution of the instructions that embody the operations of event publishing application 322. Event publishing application 322 may be written using one or more programming languages, assembly languages, scripting languages, etc.

Event publishing application 322 may be implemented as a Web application. For example, event publishing application 322 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

The computing devices of the plurality of event publishing systems 102 may receive data 324 generated by a sensor, generated or captured in response to occurrence of an event or a transaction, generated by a device such as in response to an interaction by a user with the device, etc. For example, the computing devices of the plurality of event publishing systems 102 may receive sales data as is it generated by a cash register, may receive sensor data as it is sensed by a sensor, may receive data generated by another device, etc. Data 324 may be sent to the plurality of event publishing systems 102 from any data source and streamed to ESP device 104. As used herein, data 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The computing devices of the plurality of event publishing systems 102 further may generate data 324.

Figure 4:
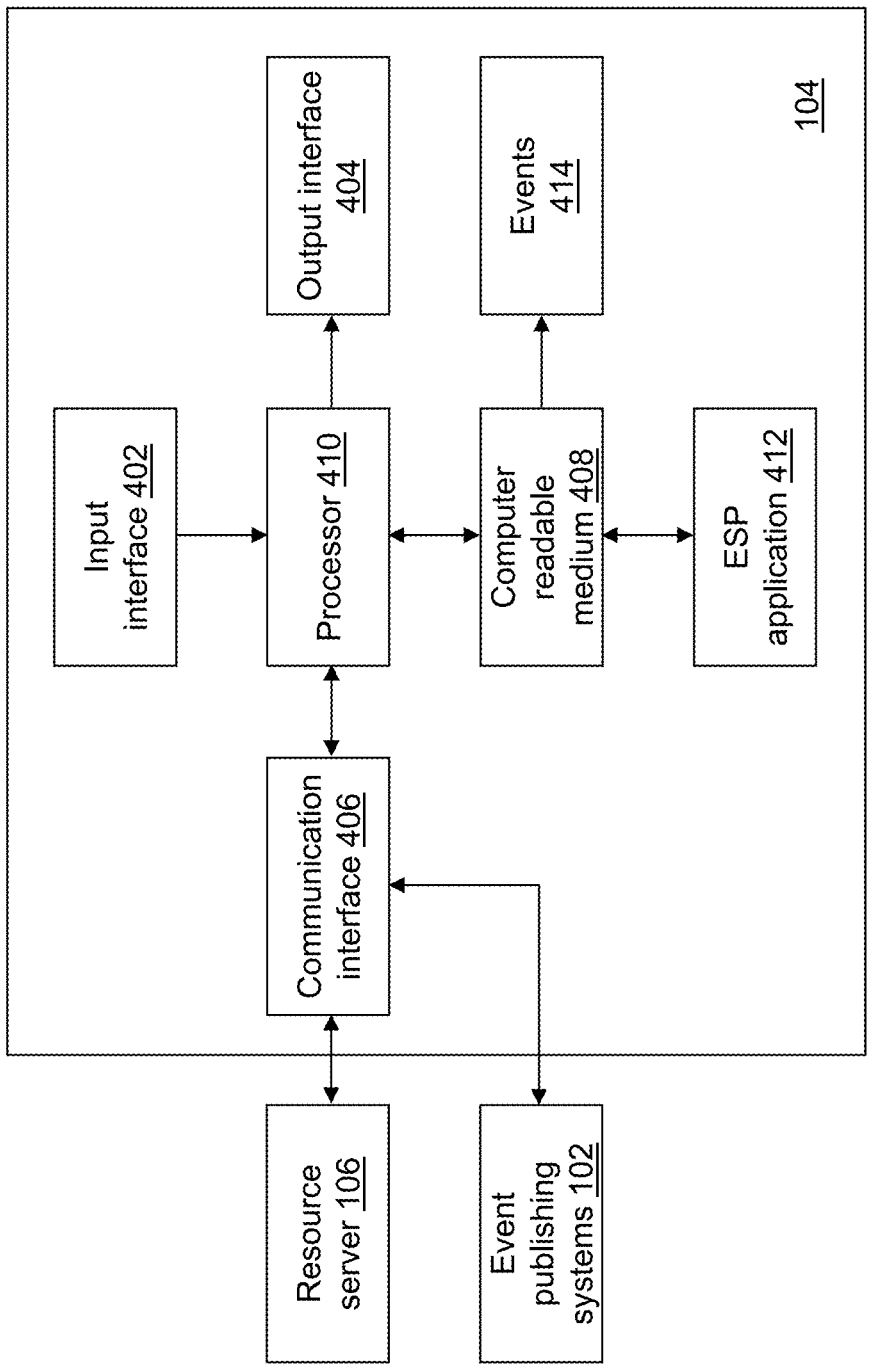
FIG. 4 depicts an event stream processing (ESP) device of the stream processing system of FIG. 1 in accordance with an illustrative embodiment.

Referring to FIG. 4, a block diagram of ESP device 104 is shown in accordance with an illustrative embodiment. ESP device 104 may include a second input interface 402, a second output interface 404, a second communication interface 406, a second computer-readable medium 408, a second processor 410, an ESP application 412, and events 414. Fewer, different, or additional components may be incorporated into ESP device 104.

Second input interface 402 provides the same or similar functionality as that described with reference to input interface 302 of event publishing system 300 though referring to ESP device 104. Second output interface 404 provides the same or similar functionality as that described with reference to output interface 304 of event publishing system 300 though referring to ESP device 104. Second communication interface 406 provides the same or similar functionality as that described with reference to communication interface 306 of event publishing system 300 though referring to ESP device 104. Data and messages may be transferred between ESP device 104 and the event publishing systems 102 and/or resource server 106 using second communication interface 406. Second computer-readable medium 408 provides the same or similar functionality as that described with reference to computer-readable medium 308 of event publishing system 300 though referring to ESP device 104. Second processor 410 provides the same or similar functionality as that described with reference to processor 310 of event publishing system 300 though referring to ESP device 104.

ESP device 104 creates events 414 from data 324 received from event publishing systems 102. Second computer-readable medium 408 may provide the electronic storage medium for events 414.

ESP application 412 performs operations associated with coordinating and controlling the performance of analytics on the data streamed from the plurality of event publishing systems 102 and with sending the processed data to resource server 106 based on a subscription request. ESP application 412 may embed an ESP engine (ESPE) with its own dedicated thread pool or pools into its application space where the main application thread can do application-specific work and the ESPE processes event streams at least by creating an instance of a model into processing objects. The operations may be implemented using hardware, firmware, software, or any combination of these methods. Referring to the example embodiment of FIG. 4, ESP application 412 is implemented in software (comprised of computer-readable and/or computer-executable instructions) stored in second computer-readable medium 408 and accessible by second processor 410 for execution of the instructions that embody the operations of ESP application 412. ESP application 412 may be written using one or more programming languages, assembly languages, scripting languages, etc. ESP application 412, for example, may be implemented as a Web application. For illustration, ESP application 412 may be the SAS® Event Stream Processing Engine developed and provided by SAS Institute Inc. of Cary, N.C., USA.

Figure 5:
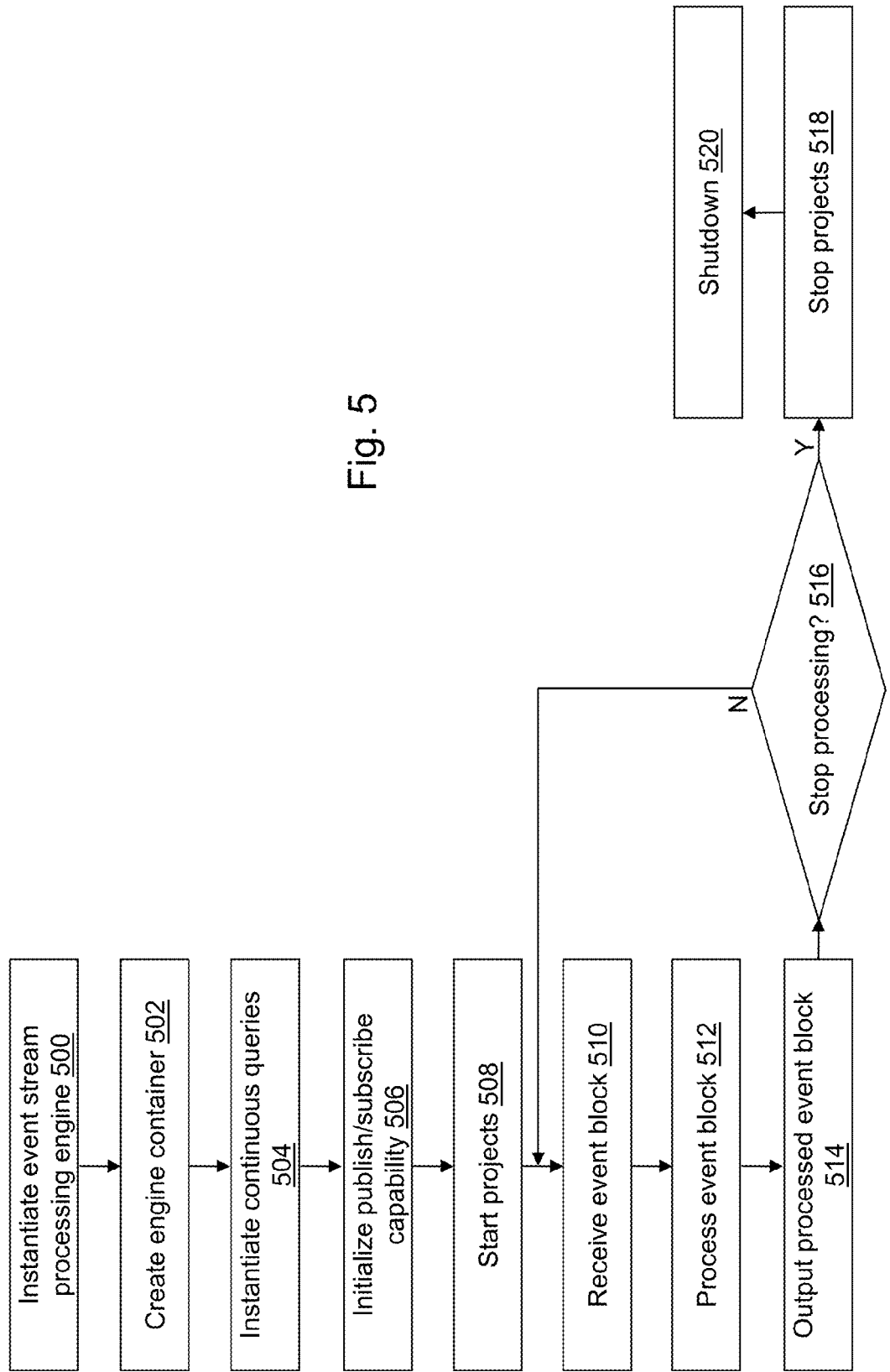
FIG. 5 depicts a flow diagram illustrating examples of operations performed by the ESP device of FIG. 4 in accordance with an illustrative embodiment.

Referring to FIG. 5, example operations associated with ESP application 412 are described. ESP application 412 defines how input event streams from publishers are transformed into meaningful output event streams consumed by subscribers. Additional, fewer, or different operations may be performed depending on the embodiment. The order of presentation of the operations of FIG. 5 is not intended to be limiting. A user can interact with one or more user interface windows presented to the user in a display such as display 218 under control of ESP application 412 independently or through a browser application in an order selectable by the user. Although some of the operational flows are presented in sequence, the various operations may be performed in various repetitions, concurrently, and/or in other orders than those that are illustrated. For example, a user may execute ESP application 412, which causes presentation of a first user interface window, which may include a plurality of menus and selectors such as drop down menus, buttons, text boxes, hyperlinks, etc. associated with ESP application 412 as understood by a person of skill in the art. As further understood by a person of skill in the art, various operations may be performed in parallel, for example, using a plurality of threads.

Figure 6:
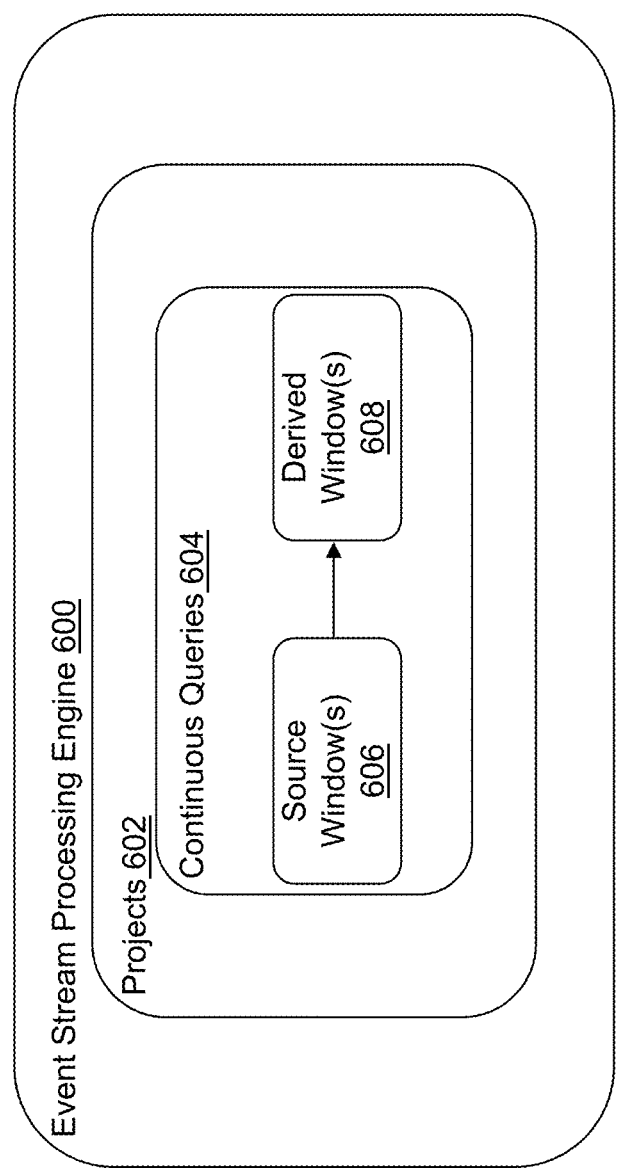
FIG. 6 depicts a block diagram of an ESP engine executing at the ESP device of FIG. 4 in accordance with an illustrative embodiment.

In an operation 500, ESP application 412 defines and starts an ESP engine (ESPE) thereby instantiating an ESPE at ESP device 104. For example, referring to FIG. 6, the components of an ESPE 600 executing at ESP device 104 are shown in accordance with an illustrative embodiment. ESPE 600 may include one or more projects 602. A project may be described as a second-level container in an engine model managed by ESPE 600 where a thread pool size for the project may be defined by a user. A value of 1 for the thread pool size indicates that writes are single-threaded. Each project of the one or more projects 602 may include one or more continuous queries 604 that contain data flows, which are data transformations of incoming event streams. The one or more continuous queries 604 may include one or more source windows 606 and one or more derived windows 608.

The engine container is the top-level container in a model that manages the resources of the one or more projects 602. In an illustrative embodiment, for example, there can be only one ESPE 600 for each instance of ESP application 412, and ESPE 600 has a unique engine name. Additionally, the one or more projects 602 may each have unique project names, and each query may have a unique continuous query name and begin with a uniquely named source window of the one or more source windows 606. ESPE 600 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 606 and the one or more derived windows 608 represent continuously executing queries that generate updates to a query result set as new event blocks stream through ESPE 600. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 600 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 604 transforms a source event stream made up of streaming event block objects published into ESPE 600 into one or more output event streams using the one or more source windows 606 and the one or more derived windows 608. A continuous query can also be thought of as data flow modeling.

The one or more source windows 606 are at the top of the directed graph and have no windows feeding into them. Event streams are published into the one or more source windows 606, and from there, the event streams are directed to the next set of connected windows as defined by the directed graph. The one or more derived windows 608 are all instantiated windows that are not source windows and that have other windows streaming events into them. The one or more derived windows 608 perform computations or transformations on the incoming event streams. The one or more derived windows 608 transform event streams based on the window type (that is operators such as join, filter, compute, aggregate, copy, pattern match, procedural, union, etc.) and window settings. As event streams are published into ESPE 600, they are continuously queried, and the resulting sets of derived windows in these queries are continuously updated.

ESP application 412 may be developed, for example, using a modeling application programming interface (API) that provides a set of classes with member functions. As an example, the SAS® ESP Engine developed and provided by SAS Institute Inc. of Cary, N.C., USA provides a modeling API that provides a set of classes with member functions. These functions enable ESP application 412 to embed ESPE 600 possibly with dedicated thread pools into its own process space. Alternatively, ESPE 600 can be embedded into the process space of an existing or a new application. In that case, a main application thread is focused on its own chores and interacts with the embedded ESPE 600 as needed.

Referring to FIG. 5, in an operation 502, the engine container is created. For illustration, ESPE 600 may be instantiated using a function call that specifies the engine container as a manager for the model. The function call may include the engine name for ESPE 600 that is provided by a user or a developer and may be unique to ESPE 600.

In an operation 504, the one or more continuous queries 604 are instantiated by ESPE 600 as a model. The one or more continuous queries 604 may be instantiated with a dedicated thread pool or pools that generate updates as new events stream through ESPE 600. For illustration, the one or more continuous queries 604 may be created to model business processing logic within ESPE 600, to predict events within ESPE 600, to model a physical system within ESPE 600, to predict the physical system state within ESPE 600, etc. For example, ESPE 600 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.), capital markets trading systems, fraud detection and prevention, personalized marketing, operational systems monitoring and management, cyber security analytics, etc.

To create a continuous query, input event structures that are schemas with keys that flow into the one or more source windows 606 may be identified. Output event structures that are also schemas with keys generated by the one or more source windows 606 and/or the one or more derived windows 608 may also be identified. For example, the block of code below illustrates creation of a compute window that normalizes a "City" field that is created for events in that window:

```
dfESPwindow_source *sw;
sw = contQuery->newWindow_source("sourceWindow", depot,
    dfESPindextypes::pi_HASH,
    dfESPstring("name:string,ID*:int32,city:string"));
dfESPschema *sw_schema = sw->getSchema( );
dfESPwindow_compute *cw;
cw = contQuery->newWindow_compute("computeWindow", depot,
    dfESPindextypes::pi_HASH,
    dfESPstring("ID*:int32,name:string,oldCity:string,
    newCity:string"));
// Register the non-key field calculation expressions.
    cw->addNonKeyFieldCalc("name"); // pass name through unchanged
    cw->addNonKeyFieldCalc("city"); // pass city through unchanged
// Run city through the blue fusion standardize function.
    char newCity[1024] = "bluefusion bf\r\n";
    strcat(newCity, "String result\r\n");
    strcat(newCity, "bf = bluefusion_initialize( )\r\n");
    strcat(newCity, "if (isnull(bf)) then\r\n");
    strcat(newCity, " print(bf.getlasterror( ))\r\n");
    strcat(newCity, "if (bf.loadqkb(\"ENUSA\") == 0) then\r\n");
    strcat(newCity, " print(bf.getlasterror( ))\r\n");
    strcat(newCity, "if (bf.standardize(\"City\",city,result) == 0) then\r\
    n");
    strcat(newCity, " print(bf.getlasterror( ))\r\n");
    strcat(newCity, "return result");
    cw->addNonKeyFieldCalc(newCity);
// Add the subscriber callbacks to the windows
    cw->addSubscriberCallback(winSubscribe_compute);
// Add window connectivity
    contQuery->addEdge(sw, 0, cw);
// create and start the project
    project->setNumThreads(2);
    myEngine->startProjects( );
// declare variables to build up the input data.
    dfESPptrVect<dfESPeventPtr> trans;
    dfESPevent *p;
// Insert multiple events
    p = new dfESPevent(sw_schema,(char *)"i,n,Jerry, 1111, apex");
    trans.push_back(p);
    p = new dfESPevent(sw_schema,(char *)"i,n,Scott, 1112, caryy");
    trans.push_back(p);
    p = new dfESPevent(sw_schema,(char *)"i,n,someone, 1113,
    rallleigh");
    trans.push_back(p);
    dfESPeventblockPtr ib = dfESPeventblock::newEventBlock(&trans,
        dfESPeventblock::ebt_TRANS);
    project->injectData(contQuery, sw, ib);
```

ESPE 600 may analyze and process events in motion or "event streams." Instead of storing data and running queries against the stored data, ESPE 600 may store queries and stream data through them to allow continuous analysis of data as it is received. The one or more source windows 606 and the one or more derived windows 608 may be created based on the relational, pattern matching, and procedural algorithms that transform the input event streams into the output event streams to model, simulate, score, test, predict, etc. based on the continuous query model defined and application to the streamed data.

In an operation 506, a publish/subscribe (pub/sub) capability is initialized for ESPE 600. In an illustrative embodiment, a pub/sub capability is initialized for each project of the one or more projects 602. To initialize and enable pub/sub capability for ESPE 600, a port number is provided. Pub/sub clients can use a host name of ESP device 104 and the port number to establish pub/sub connections to ESPE 600. For example, a server listener socket is opened for the port number to enable event publishing systems 102 and resource server 106 to connect to ESPE 600 for publish/subscribe services. The host name of ESP device 104 and the port number to establish pub/sub connections to ESPE 600 may be referred to as the host:port designation of ESPE 600 executing at ESP device 104.

Publish-subscribe is a message-oriented interaction paradigm based on indirect addressing. Processed data recipients specify their interest in receiving information from ESPE 600 by subscribing to specific classes of events, while information sources publish events to ESPE 600 without directly addressing the receiving parties. ESPE 600 coordinates the interactions and processes the data. In some cases, the data source receives confirmation that the published information has been received by a data recipient.

A publish/subscribe API may be described as a library that enables an event publisher, such as event publishing system 300, to publish event streams into ESPE 600 or an event subscriber, such as resource server 106, to subscribe to event streams from ESPE 600. For illustration, one or more publish/subscribe APIs may be defined. As an example, a version of the SAS® ESP Engine offered by SAS Institute Inc. can provide a C++ publish/subscribe API and a Java publish/subscribe API. Using the publish/subscribe API, event publishing application 322 may publish event streams into a running event stream processor project source window of ESPE 600, and resource server 106 may subscribe to an event stream processor project source window of ESPE 600. The publish/subscribe API provides cross-platform connectivity and endianness compatibility between ESP application 412 and other networked applications.

Referring again to FIG. 5, operation 506 initializes the publish/subscribe capability of ESPE 600. In an operation 508, the one or more projects 602 are started. The one or more started projects may run in the background on ESP device 104.

In an operation 510, an event block object is received from one or more computing device of the event publishing systems 102, for example, from event publishing system 300. An event block object containing one or more event objects is injected into a source window of the one or more source windows 606 from an instance of event publishing application 322. The unique ID assigned to the event block object by event publishing system 300 is maintained as the event block object is passed between the one or more source windows 606 and/or the one or more derived windows 608 of ESPE 600. A unique embedded transaction ID further may be embedded in the event block object as the event block object is processed by a continuous query.

In an operation 512, the event block object is processed through the one or more continuous queries 604. In an operation 514, the processed event block object is output to resource server 106.

ESPE 600 maintains the event block containership aspect of the received event blocks from when the event block is published into a source window and works its way through the directed graph defined by the one or more continuous queries 604 with the various event translations before being output to subscribers, such as resource server 106. Subscribers can correlate a group of subscribed events back to a group of published events by comparing the unique ID of the event block object that a publisher, such as event publishing system 300, attached to the event block object with the event block ID received by the subscriber.

In an operation 516, a determination is made concerning whether or not processing is stopped. If processing is not stopped, processing continues in operation 510 to continue receiving the one or more event streams containing event block objects from the one or more computing devices of the event publishing systems 102. If processing is stopped, processing continues in an operation 518. In operation 518, the started projects are stopped. In operation 520, ESPE 600 is shutdown.

Figure 7:
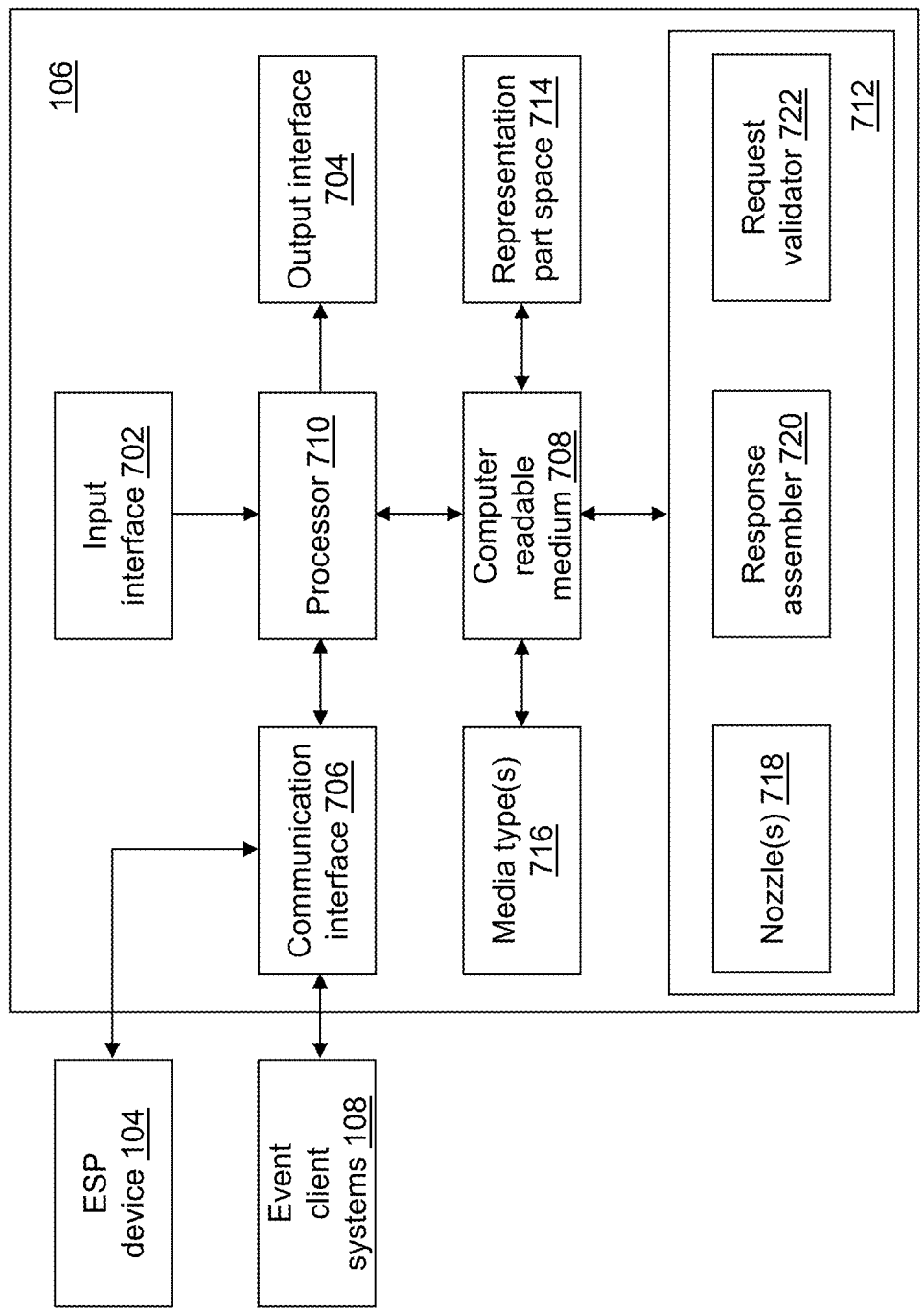
FIG. 7 depicts a resource server of the stream processing system of FIG. 1 in accordance with an illustrative embodiment.

Referring to FIG. 7, a block diagram of resource server 106 is shown in accordance with an example embodiment. Resource server 106 may include a third input interface 702, a third output interface 704, a third communication interface 706, a third computer-readable medium 708, a third processor 710, a resource service application 712, a representation part space 714, and one or more media types 716. Fewer, different, and additional components may be incorporated into resource server 106.

Third input interface 702 provides the same or similar functionality as that described with reference to input interface 302 of event publishing system 300 though referring to resource server 106. Third output interface 704 provides the same or similar functionality as that described with reference to output interface 304 of event publishing system 300 though referring to resource server 106. Third communication interface 706 provides the same or similar functionality as that described with reference to communication interface 306 of event publishing system 300 though referring to resource server 106. Data and messages may be transferred between resource server 106 and the event client systems 108 and the plurality of event publishing systems 102 or ESP device 104 using third communication interface 706. Third computer-readable medium 708 provides the same or similar functionality as that described with reference to computer-readable medium 308 of event publishing system 300 though referring to resource server 106. Third processor 710 provides the same or similar functionality as that described with reference to processor 310 of event publishing system 300 though referring to resource server 106.

Resource service application 712 may include one or more nozzles 718, a response assembler 720, and a request validator 722. The one or more nozzles 718, response assembler 720, and request validator 722 of resource service application 712 may be the same or different applications or part of an integrated, distributed application. The streamed data may be received from ESP device 104 or from one or more of the event publishing systems 102.

The one or more nozzles 718, response assembler 720, and request validator 722 of resource service application 712 perform operations associated with supporting receipt and processing of streamed data that includes events 414 and provision of pre-rendered and compressed events to one or more of the event client systems 108. Events 414 define an event stream that may be described as a flow of event block objects, where an event block object may be described as a grouping or package of event objects. A unique ID is assigned to the event block object, and each event object of the event block object is also assigned a key or unique ID as discussed previously. The operations may be implemented using hardware, firmware, software, or any combination of these methods. Referring to the example embodiment of FIG. 7, the one or more nozzles 718, response assembler 720, and request validator 722 of resource service application 712 are implemented in software (comprised of computer-readable and/or computer-executable instructions) stored in third computer-readable medium 708 and accessible by third processor 710 for execution of the instructions that embody the operations of resource service application 712. The one or more nozzles 718, response assembler 720, and request validator 722 of resource service application 712 may be written using one or more programming languages, assembly languages, scripting languages, etc. The one or more nozzles 718, response assembler 720, and request validator 722 may be written using different languages. One or more of the nozzles 718, response assembler 720, and request validator 722 of resource service application 712 may be implemented as Web applications.

Execution of resource service application 712 may instantiate a microservice that serves resources that rapidly change. For example, resource service application 712 provides high-throughput event streams to user-interface (UI) clients executing at one or more client system of the event client systems 108. The resource is representation part space 714, where a new event object includes a unique key, such as the key or unique ID defined by the event publishing system that generated the event object and maintained through ESPE 600, so that resource service application 712 can replace a previous version of the event object. The possible scenarios supported by resource service application 712 may arise from two dimensions—a refresh rate supported by a client system of the event client systems 108 and a number of concurrent client systems of the event client systems 108 that are using stream processing system 100. The number of concurrent client systems is bounded only by hardware capacity, so more devices of the event client systems 108 can be served by scaling vertically and/or horizontally.

Resource service application 712 can be used, for example, to support a stock ticker at a low refresh rate to any number of computing devices of event client systems 108. Resource service application 712 further can be used, for example, to support real-time visualization applications such as augmented reality to any number of computing devices of event client systems 108 over network 110. For example, visualizations may appear and disappear rapidly based on head movement.

In an illustrative embodiment, resource service application 712 fits the REST architectural style language as a connector of type server. Resource service application 712 may co-exist with the other connector types—client, cache, resolver and tunnel—subject to the REST architectural style, the HTTP and HTTPS protocols, and the potentially changing architecture of network 110.

Figure 8:
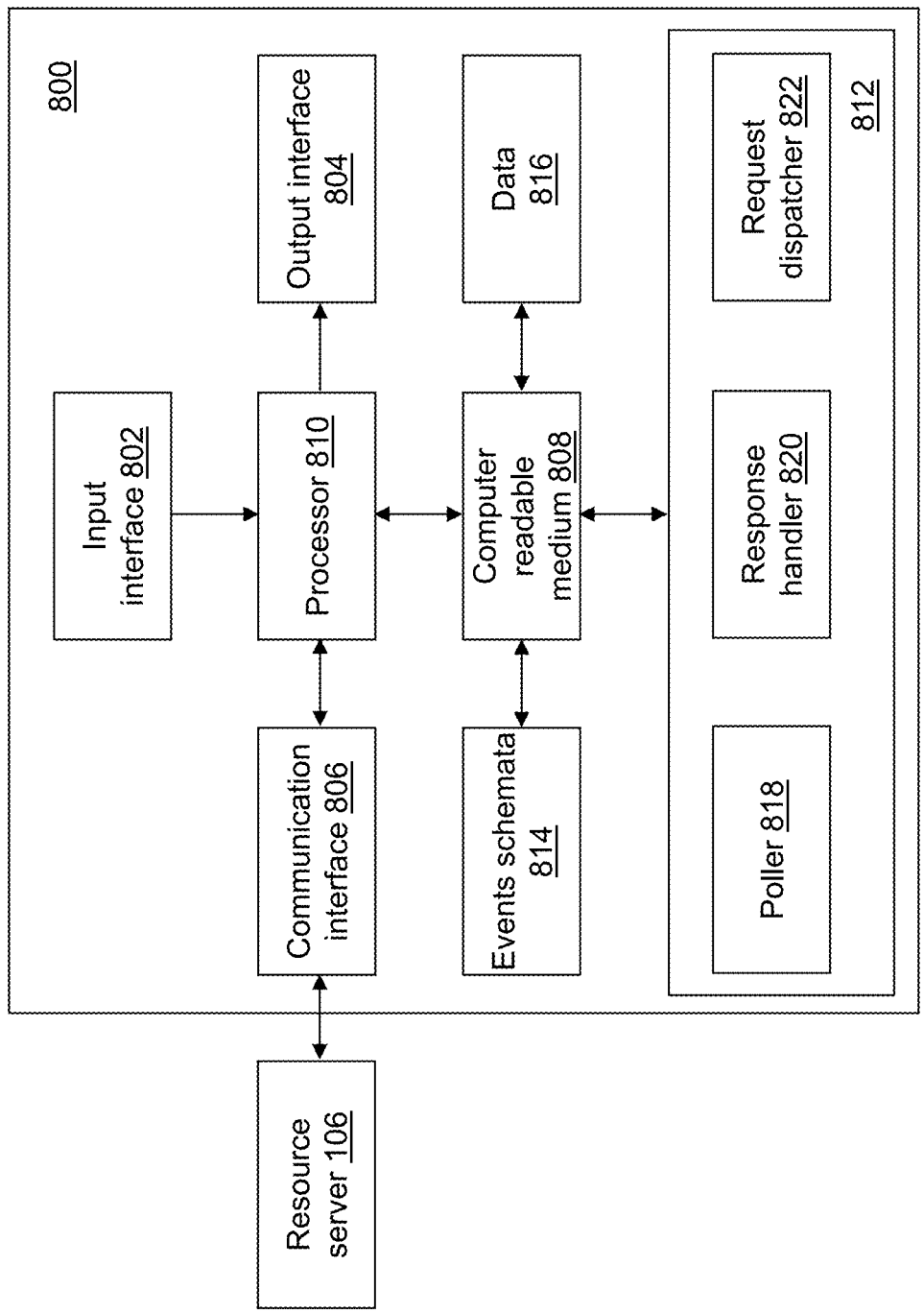
FIG. 8 depicts an event client system of the stream processing system of FIG. 1 in accordance with an illustrative embodiment.

Referring to FIG. 8, a block diagram of an event client system 800 is shown in accordance with an example embodiment. Event client system 800 is an example computing device of the event client systems 108. For example, each of smart phone 120, desktop 122, server computer 124, and laptop 126 is an instance of event client system 800. Event client system 800 may include a fourth input interface 802, a fourth output interface 804, a fourth communication interface 806, a fourth computer-readable medium 808, a fourth processor 810, a client application 812, one or more events schemata 814, and data 816. Fewer, different, and additional components may be incorporated into event client system 800.

Fourth input interface 802 provides the same or similar functionality as that described with reference to input interface 302 of event publishing system 300 though referring to event client system 800. Fourth output interface 804 provides the same or similar functionality as that described with reference to output interface 304 of event publishing system 300 though referring to event client system 800. Fourth communication interface 806 provides the same or similar functionality as that described with reference to communication interface 306 of event publishing system 300 though referring to event client system 800. Data and messages may be transferred between resource server 106 and event client system 800 using fourth communication interface 806. Fourth computer-readable medium 808 provides the same or similar functionality as that described with reference to computer-readable medium 308 of event publishing system 300 though referring to event client system 800. Fourth processor 810 provides the same or similar functionality as that described with reference to processor 310 of event publishing system 300 though referring to event client system 800.

Client application 812 may include a poller 818, a response handler 820, and a request dispatcher 822. Poller 818, response handler 820, and request dispatcher 822 of client application 812 may be the same or different applications or part of an integrated, distributed application.

Poller 818, response handler 820, and request dispatcher 822 of client application 812 perform operations associated with requesting new events and receiving pre-rendered and compressed events from resource server 106. The operations may be implemented using hardware, firmware, software, or any combination of these methods. Referring to the example embodiment of FIG. 8, poller 818, response handler 820, and request dispatcher 822 of client application 812 are implemented in software (comprised of computer-readable and/or computer-executable instructions) stored in fourth computer-readable medium 808 and accessible by fourth processor 810 for execution of the instructions that embody the operations of client application 812. Poller 818, response handler 820, and request dispatcher 822 of client application 812 may be written using one or more programming languages, assembly languages, scripting languages, etc. Poller 818, response handler 820, and request dispatcher 822 of client application 812 may be written using different languages. One or more of poller 818, response handler 820, and request dispatcher 822 of client application 812 may be implemented as Web applications.

Client application 812 may adhere to the REST architectural style. The REST uniform contract is based on three fundamental elements:

a resource identifier syntax that expresses where the data is being transferred to or from;

methods that define the protocol mechanisms used to transfer the data; and one or more media types 716 that define the type of data being transferred.

An event schema provides a description of the semantics and format of a type of event (event block object). An event of events 414 agrees with an event schema of events schemata 814 that affects a state-change. Representation part space 714 contains a set of uniquely keyed event objects for the type of event. In REST terms, an event is "PUT" into representation part space 714. Representation part space 714 may be a REST resource, and an event space resource can be part of an encompassing resource. The latter arrangement allows for pertinent metadata to be shared and for multiple event-spaces to be passed to event client system 800 in a single response. Each event schema of events schemata 814 codifies an event type for the type of event.

A media type of media types 716 is a RESTful media type that describes the semantics and format of a type of representation. A representation is a RESTful representation that represents a resource at a point in time based on a media type. A media type contains one or more event schemas of events schemata 814. Both serve as a contract between client application 812 and resource service application 712. Representations contain events of one or more media type. Example media types include JavaScript object notation (JSON), plain text, XML, an image file format such as JPG, etc. Media types can also be developed for specific cases. For example, a JSON media type can represent the layout of an industrial space. A representation of the media type may represent a particular layout of a particular industrial space.

JSON is an open standard data-interchange format that uses human-readable text to transmit data objects consisting of attribute-value pairs. JSON is used primarily to transmit data between a server and a web application and as an alternative to XML. Although originally derived from the JavaScript scripting language, JSON is a language-independent data format.

JSON is built on two structures: 1) a collection of name/value pairs, and 2) an ordered list of values. In various languages, the collection of name/value pairs is realized as an object, record, struct, dictionary, hash table, keyed list, or associative array. In most languages, the ordered list of values is realized as an array, vector, list, or sequence. These are universal data structures supported by virtually all modern programming languages in one form or another.

In JSON, an object is an unordered set of name/value pairs. An object begins with a left brace ("{") and ends with a right brace ("}"). Each name is followed by a colon (":")

and the name/value pairs are separated by a comma (",") in the form "{string:value}, {string:value}, ... {string:value}".

Figure 9:
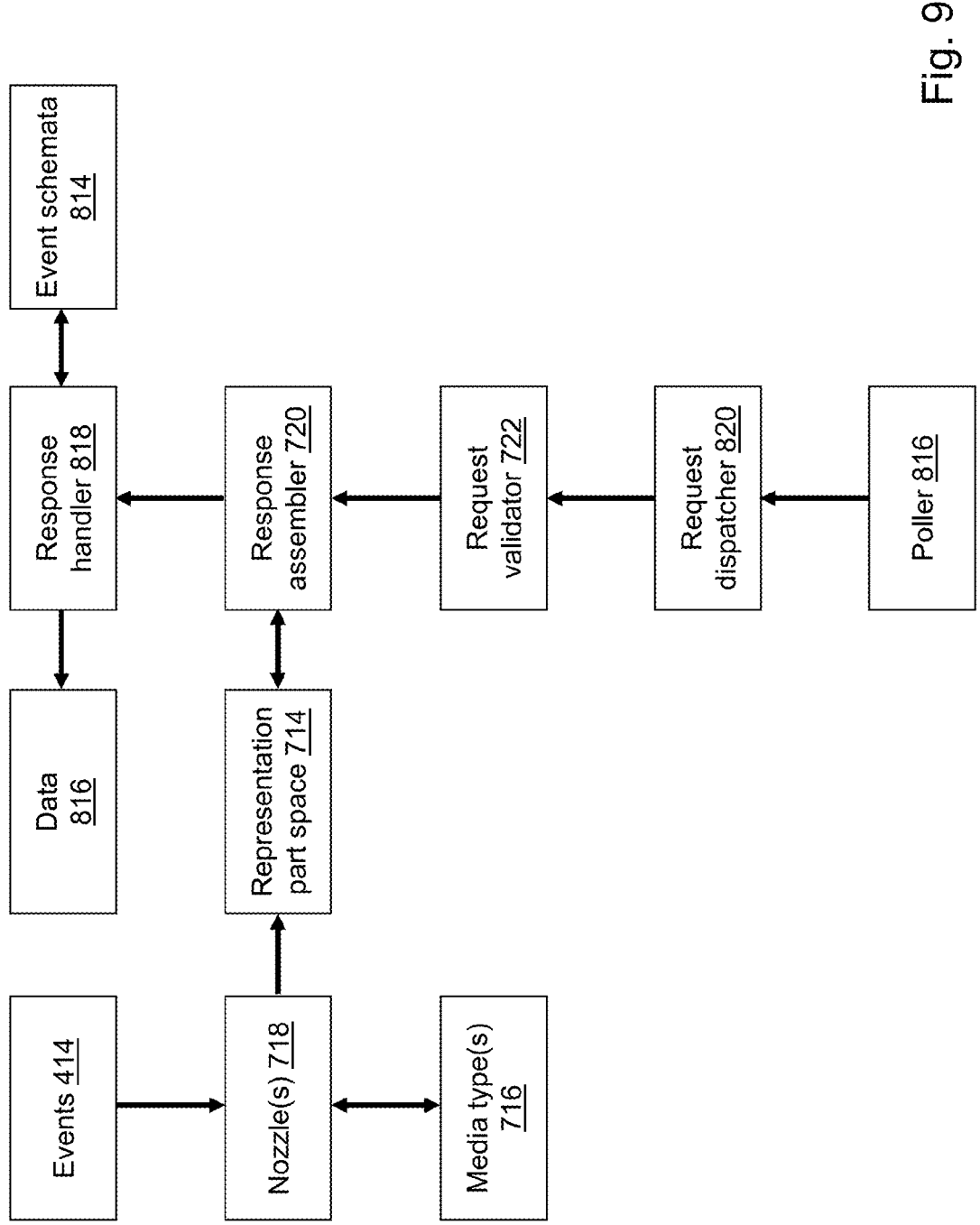
FIG. 9 depicts a block diagram illustrating interactions between the components of the resource server of FIG. 7 and each event client system of FIG. 8 in accordance with an illustrative embodiment.

Referring to FIG. 9, a block diagram illustrating the interactions between the components of resource server 106 and each event client system 800 of the event client systems 108 is shown in accordance with an illustrative embodiment. Events 414 are received from ESP device 104 or from the event publishing systems 102.

Nozzles 718 make representations of each event object of events 414 for a particular media type of media types 716 and store the representations in representation part space 714. Nozzles 718 may be pluggable for the different media types. Nozzles 718 operate in the same address space as the rest of the components of resource service application 712 and are called via a by-reference as opposed to a by-value API. A nozzle of nozzles 718 pre-renders parts of a representation in accordance with the event schema and media type of the event object. The nozzle pre-rendering includes rendering of compressed blocks. For example, gzip compression may be used to minimize the amount of redundant compression work.

Poller 816 repeatedly polls for the latest version of a resource (event object) of representation part space 714. For UIs, the polling for the resource may correspond to the refresh rate or frame rate of the display connected through output interface 804 or communication interface 806 of event client system 800. Each representation is a snapshot of a stream resource at a point of time. Each event client system 800 of the event client systems 108 may receive the same or a different series of representation parts. Poller 816 triggers request dispatcher 820 to dispatch a request (e.g., a GET) to resource server 106. Multiple requestor threads can dispatch simultaneous requests from request dispatcher 820.

Request validator 722 receives the request from request dispatcher 820 and validates the request. An authorization service may confirm that each event client system 800 of the event client systems 108 is authorized to receive events from representation part space 714 initially using a separate service. The authorization information may be injected into request validator 722 for processing. Request validator 722 may be pluggable using a by-reference API. New methods for validating requests can be introduced by adding a new request validation method to request validator 722.

Response assembler 720 receives the validated request and selects one or more events from representation part space 714 to send to the requesting event client system 800. The request may include parameters that exclude events from the response. For example, some events may not be within a graphics clipping region and, as a result, do not need to be included and sent to the requesting event client system 800 because the requesting event client system 800 will not use the event object. The appropriate nozzle of nozzles 718 is called by response assembler 720 to make representations of the selected one or more representation parts representing events based on the media type of the nozzle. Response assembler 720 very quickly assembles the representation out of pre-rendered parts.

A handler of response handler 820 receives the representations from response assembler 720 and handles the representation, for example, by using events schemata 814 to define data 816 that may be consumed by another application such as a UI application. Response processing may be handled on a main thread of event client system 800, which may apply the response to an object model. A renderer may read the object and operate using WebGL to affect graphics managed by a graphical processing unit (GPU) on the display accessible by event client system 800.

To optimize the throughput, the representation or data structure defining the event object based on the media type is optimized. There are two parts to the optimization: optimizing the creation of the representation and optimizing the handling of the representation. Resource service application 712 and client application 812 create optimized media types and plug them into already optimized frameworks for creating and consuming the media types. This flexibility means that performance does not suffer due to a sub-optimal least common denominator media type. Creating the final representation in response to a request occurs on a separate thread from that executing nozzles 718 as discussed further below.

Stream processing system 100 performs better when optimized data structures that can be quickly rendered by graphics software on event client system 800 are used. The client processing capacity of event client system 800 should be minimally occupied with transformation from one data structure format to another. Instead, the media type is optimized so that application of the representation to the geometric data structures supported by event client system 800 is fast. Thus, the definition of the media type can be primarily driven by performance considerations of rendering the graphics. The nozzle handles the optimizations when the events are being readied for transmission to requesting event client system 800, for example, as JSON. The events may be sensor data streamed in a binary format that is converted to JSON by the nozzle before transmission to event client system 800.

Figure 10A:
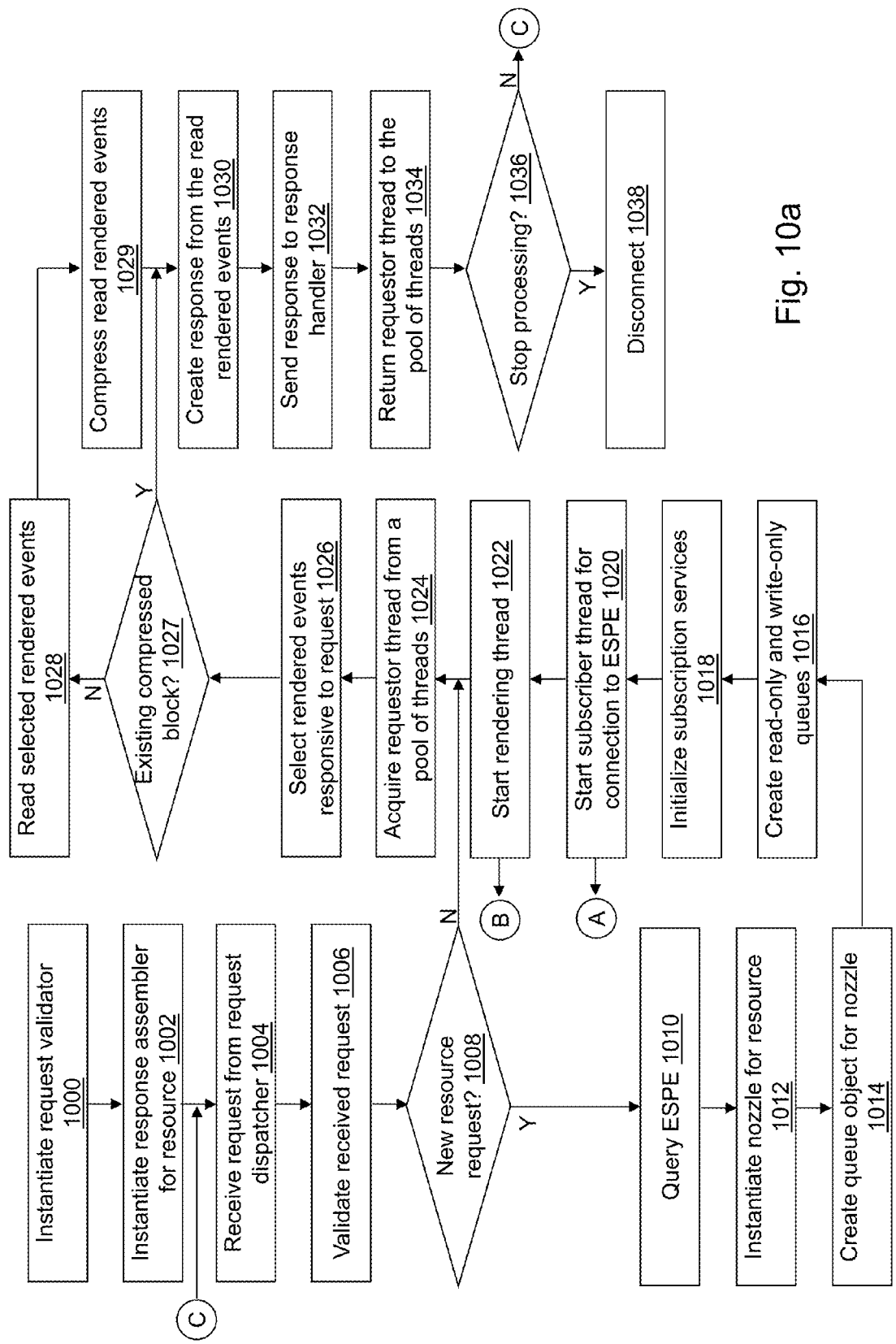
FIGS. 10a, 10b, and 10c depict a flow diagram illustrating examples of operations performed by the resource server of FIG. 7 in accordance with an illustrative embodiment.
Figure 10B:
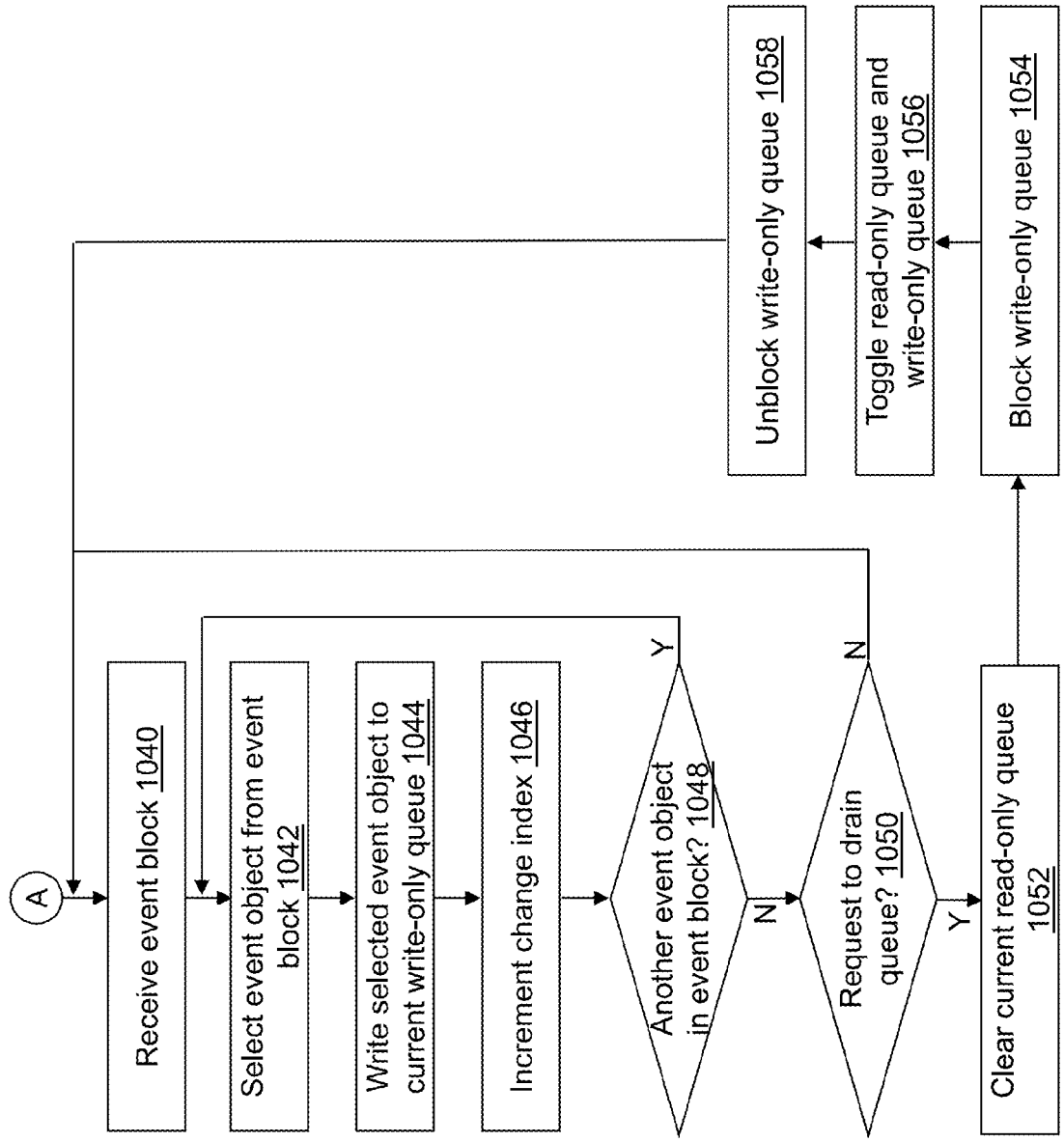
Figure 10C:
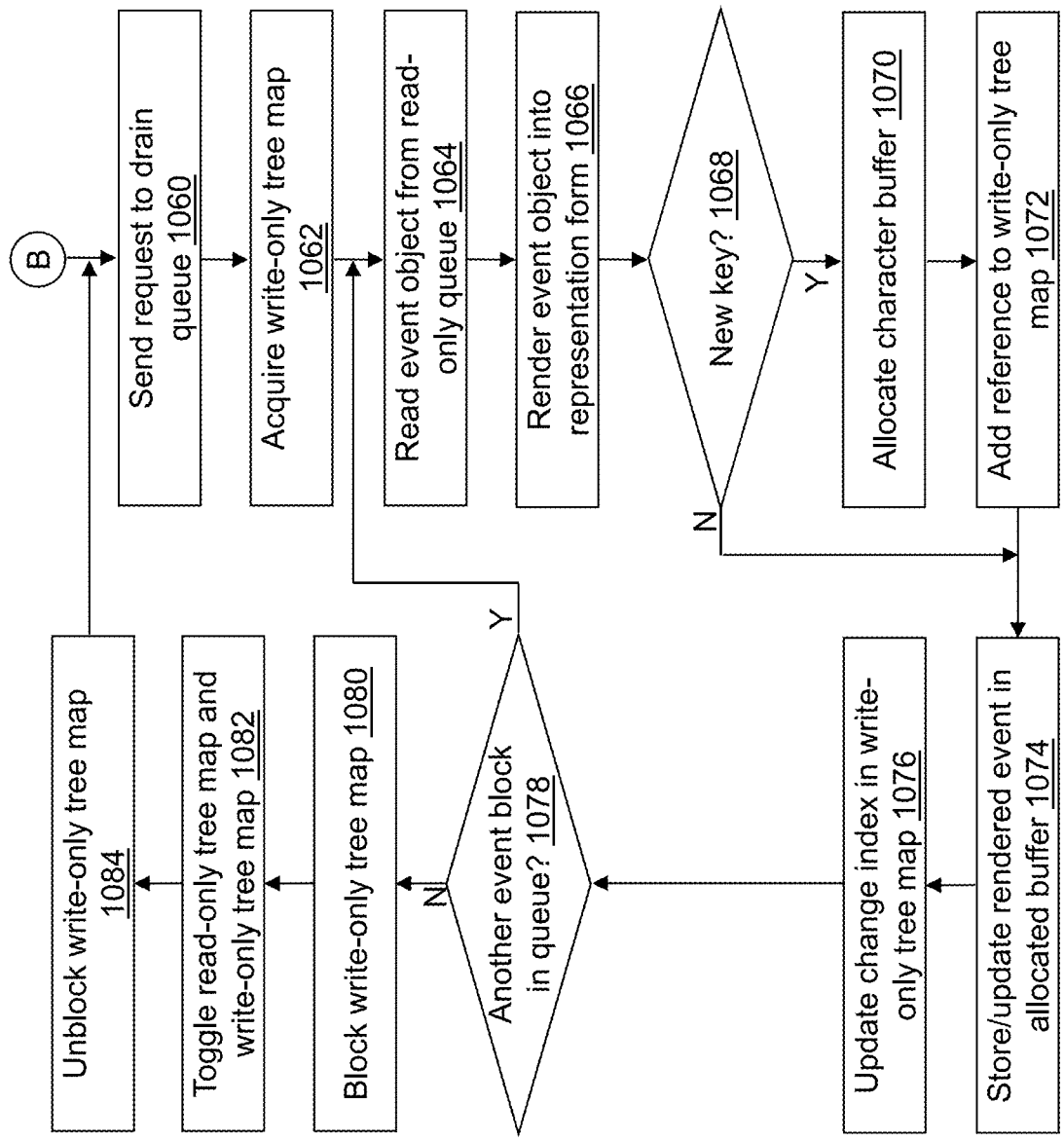

Referring to FIGS. 10a, 10b, and 10c example operations associated with execution of resource service application 712 are described. Additional, fewer, or different operations may be performed depending on the embodiment. The order of presentation of the operations of FIGS. 10a, 10b, and 10c is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of processors and/or a plurality of threads.

In an operation 1000, a request validator instance of request validator 722 is instantiated to receive requests from request dispatcher 822 executing at event client system 800. In an operation 1002, a response assembler instance of response assembler 1016 is instantiated to assemble and send the response to response handler 820 executing at event client system 800. The instantiated request validator instance and the instantiated response assembler instance may be associated with one or more nozzle instance of nozzles 718.

In an operation 1004, a request is received by the request validator instance from request dispatcher 822. The resource requested is modified with 'changes since' followed by a last event index. For example, 'changes since 0' includes the last event index of "0" and returns all of the events in representation part space 714. The last event index indicates the last change index that the requesting event client system 800 has received.

In an operation 1006, the received request is validated by the request validator instance.

In an operation 1008, a determination is made concerning whether or not the request is for a new resource. For example, a first request for the resource may be sent as part of an initial communication between resource server 106 and event client system 800. If the request is for a new resource, processing continues in an operation 1010. If the request is not for a new resource, processing continues in an operation 1024.

In operation 1010, ESPE 600 is queried, for example, to discover names of projects 602, of continuous queries 604, of windows 606,608, of window schema, and of window edges currently running in ESPE 600. The host name of ESP device 104, the engine name of ESPE 600, and the port number opened by ESPE 600 may be provided as an input to the query and a list of strings may be returned with the names to the projects 602, continuous queries 604, windows 606, 608, window schema, and/or window edges.

In an operation 1012, a nozzle instance is instantiated for the resource and mapped to the base URI for the stream that the nozzle instance serves. While a nozzle is specific to a particular media type, there may be multiple streams that are expressed as the same media type. For example, each nozzle instance is associated with a media type of media types 716. The media type may include one or more event object type schemas.

For example, the event type may be defined for a type of commodity and is keyed with a commodity symbol. The type is implemented as a string variable and a map of value names and values. Within a JSON media-type, the event schema could be realized as an array of JSON objects as shown for illustration below:

```
{
    "symbol": "QQQQ",
    "values": {
        "valueName1": 1,
        "valueName2": 2,
        "valueName3": 3
    }
}
```

Alternatively, the event data could be communicated in a tabular form. In this case, one object in the JSON document defines the column names for all symbols:

```
{
    "columnHeadings": [
        "valueName1",
        "valueName2",
        "valueName3"
    ]
}
```

Each object then specifies the values in an array instead of a map:

```
{
    "symbol": "QQQQ",
    "values": [
        1,
        2,
        3
    ]
}
```

Depending on factors related to event client system 800, including parsing implementation and expected programmatic use of the objects, the best form can be selected by the API developer.

Each nozzle of nozzles 718 is an independent component that handles the preparation of representations of each event object for a particular media type. By being independent, a new media type can be plugged-in to resource server 106 without requiring changes to the rest of the infrastructure.

Figure 11:
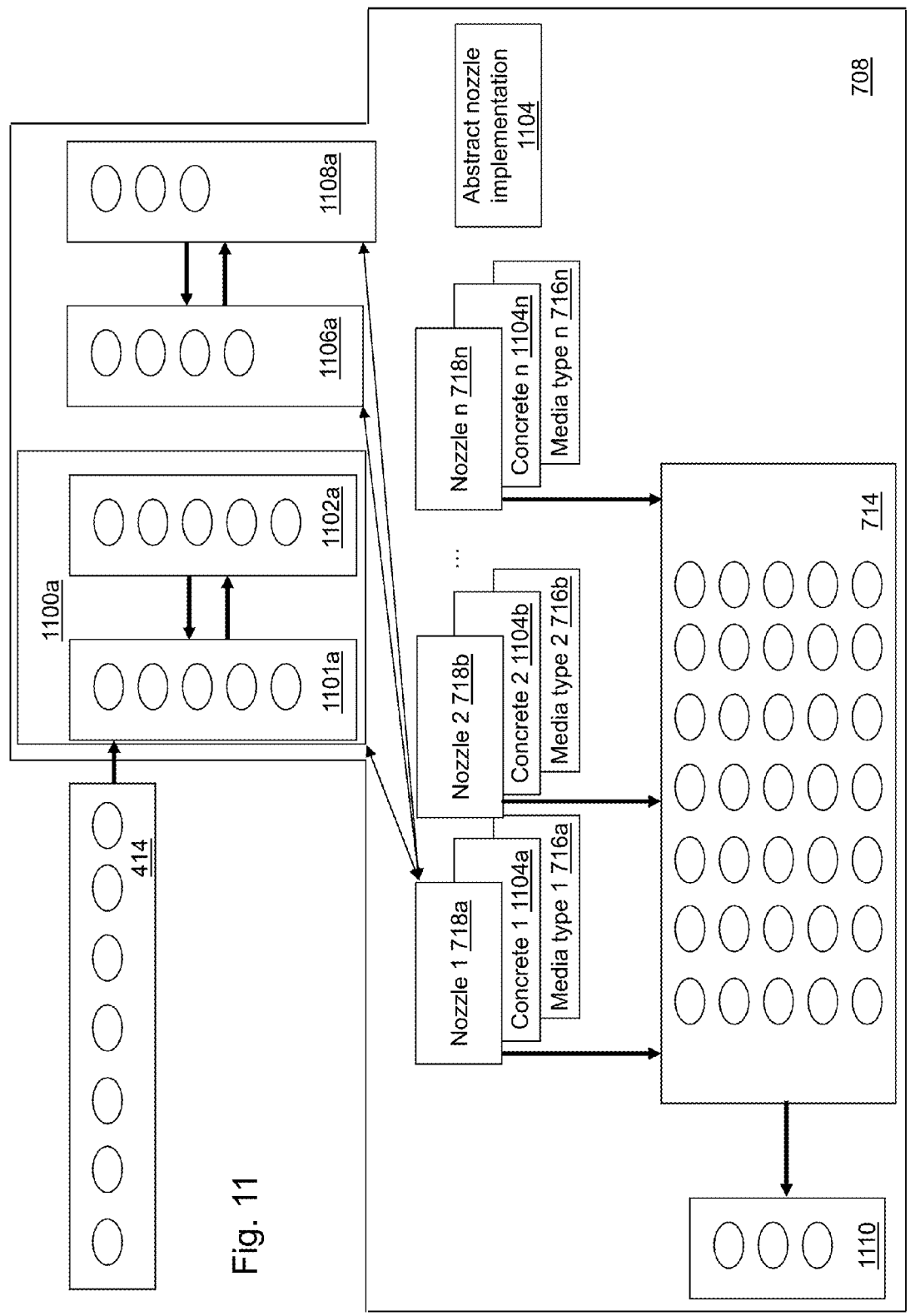
FIG. 11 depicts a block diagram illustrating nozzle execution by the resource server of FIG. 7 in accordance with an illustrative embodiment.

Referring to FIG. 11, each nozzle includes an abstract nozzle implementation 1104 and a concrete nozzle implementation. A new media type can be introduced by adding a new nozzle to nozzles 718. A new nozzle is a new class that inherits from abstract nozzle implementation 1104. A plurality of nozzles, nozzle 1 718a, nozzle 2 718b, . . . , nozzle n 718n, may be instantiated at resource server 106 to each process a different media type of media types 716. For example, each nozzle of the plurality of nozzles, nozzle 1 718a, nozzle 2 718b, . . . , nozzle n 718n, is based on abstract nozzle implementation 1104 and a corresponding concrete nozzle implementation, concrete 1 1104a, concrete 2 1104b, . . . , concrete n 1104n, respectively, based on a media type 1 716a, media type 2 716b, . . . , media type n 716n, respectively.

Multi-threading and concurrency are handled by abstract nozzle implementation 1104 while rendering of representation parts is handled by concrete 1 1104a, concrete 2 1104b, . . . , concrete n 1104n determined from a corresponding event schema of events schemata 814. Each nozzle of nozzles 718 is encoded with specific knowledge of a media type, the event schemas of the incoming stream, and the equivalent event schema of the media type. Concrete 1 1104a, concrete 2 1104b, . . . , concrete n 1104n derive from abstract nozzle implementation 1104, which is common to all nozzles 718. Abstract nozzle implementation 1104 controls the thread so that concrete 1 1104a, concrete 2 1104b, . . . , concrete n 1104n can focus solely on making representation parts for each event object of the event.

Figure 12:
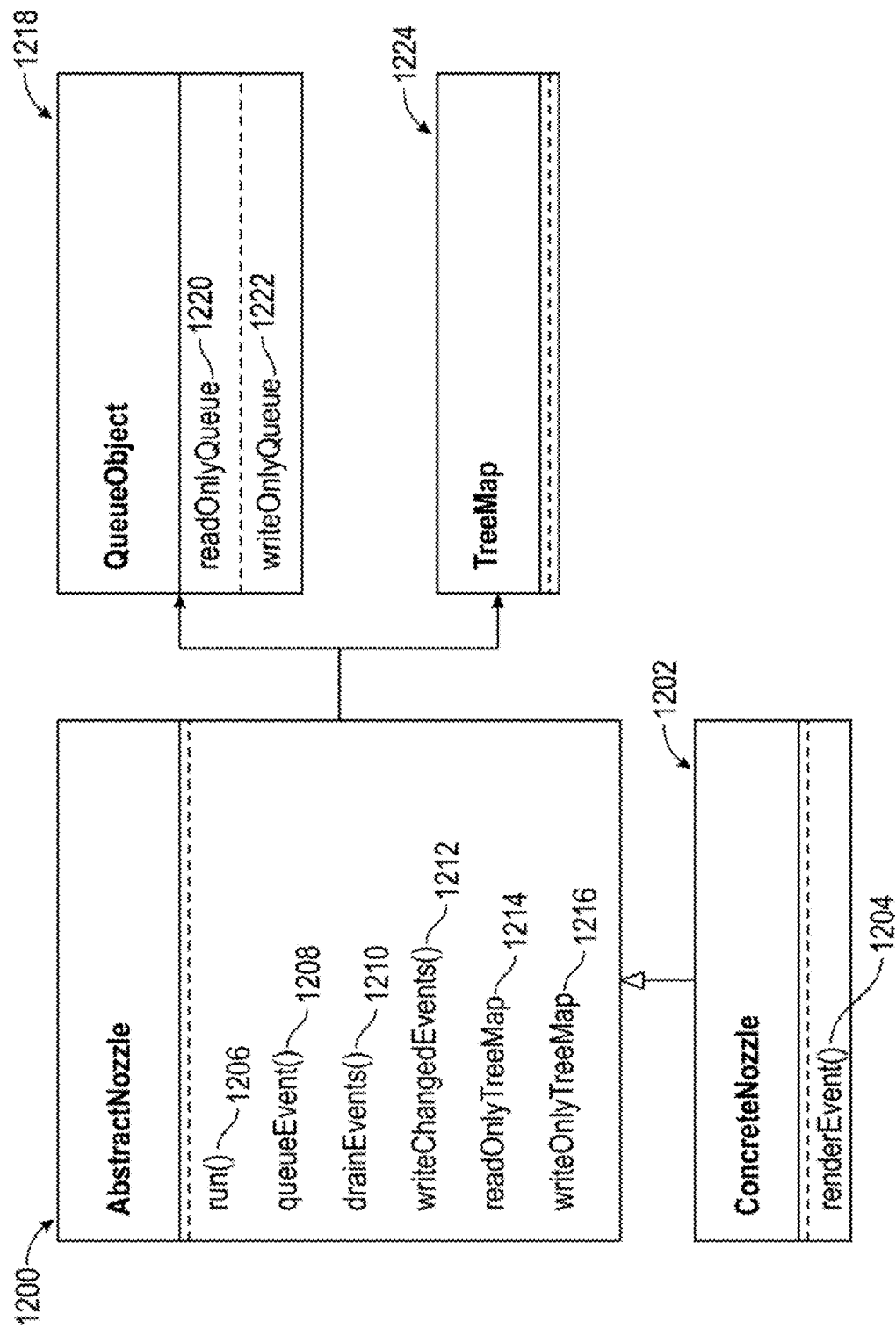
FIG. 12 depicts a nozzle class structure in accordance with an illustrative embodiment.

For illustration, referring to FIG. 12, abstract nozzle implementation 1104 is based on an abstract nozzle class 1200 and each of concrete 1 1104a, concrete 2 1104b, . . . , concrete n 1104n are based on a concrete nozzle class 1202. Concrete nozzle class 1202 may include a "renderEvent" method 1204. Abstract nozzle class 1200 may include a "run" method 1206, a "queueEvent" method 1208, a "drainEvents" method 1210, a "writeChangedEvents" method 1212, a "readOnlyTreeMap" member 1214, and a "writeOnlyTreeMap" member 1216. Concrete nozzle class 1202 may include a "renderEvent" method 1204. Abstract nozzle class 1200 further may include a queue object created when each concrete nozzle is instantiated based on a queue object class 1218 and a tree map created when each concrete nozzle is instantiated based on a tree map class 1224. Queue object class 1218 may include a "readOnlyQueue" member 1220 and a "writeOnlyQueue" member 1222.

"run" method 1206 executes a body of an infinite loop of a rendering thread. The core of the method is a call to "drainEvents" method 1210 followed by a call to "writeChangedEvents" method 1212. The remainder of "run" method 1206 performs error handling.

"queueEvent" method 1208 is called on a subscriber thread and appends a single event object on a write-only queue identified by a value of "writeOnlyQueue" member 1222.

"drainEvents" method 1210 drains events from a read-only queue identified by a value of "readOnlyQueue" member 1220.

"writeChangedEvents" method 1212 writes the representation parts that represent the events so that they are available for requests.

"renderEvent" method 1204 is implemented by a concrete nozzle to render a single event object to a representation part. For example, the incoming event is a commodity trading symbol and includes several updated values pertaining to the commodity in a certain market. Event client system 800 has a unique n-dimensional visualization for the commodity, such as a polyhedron with spikes representing n−3 values, and a position of the polyhedron representing the remaining 3 values. A developer only needs to write an implementation for "renderEvent" method 1204 to be able to communicate an optimal data structure over the standard Web in fixed-memory event space with the possibility of scaling to an unbounded number of users at high throughput rates.

Abstract nozzle implementation 1104 defers to the concrete nozzle implementation for rendering the incoming event object as a representation part according to the rules of the event schema for the nozzle's media type. For example, an event block of events 414 that carries a payload of 10 numeric values of different numeric types and 2 character fields may be rendered as a textual JSON snippet. Each of the twelve event objects includes a different key. Each event object may be updated at different times.

The components of stream processing system 100 understand how to interact with abstract nozzle implementation 1104, and a new nozzle acts concretely for a given media type and specific event schemas. Each nozzle instance runs on its own thread and receives events and renders them in a logical form that is ready for compression and encryption. For example, for a JSON-based media type that transports numerical event data, the nozzle renders incoming data that may be in various formats as character data agreeing with the rules of JSON as well as rules of the media type.

Referring again to FIG. 10*a*, in an operation 1014, the queue object is created for the nozzle instance such as for concrete 1 1104*a* inheriting from abstract nozzle implementation 1104 as part of processing by "run" method 1206. In an operation 1016, the read-only queue and the write-only queue are created for the queue object of the nozzle instance. The write-only queue is contained inside the queue object and is paired with the read-only queue. The value of "readOnlyQueue" member 1220 includes a reference or a pointer to the created read-only queue. The value of "writeOnlyQueue" member 1222 includes a reference or a pointer to the created write-only queue.

The queue object manages these two queues on behalf of the nozzle. For example referring to FIG. 11, a queue object 1 1100*a* is created by nozzle 1 718*a* that is an instance of concrete 1 1104*a* based on media type 716*a*. Queue object 1 1100*a* may include a read-only queue 1101*a* and a write-only queue 1102*a*. Each nozzle creates its own queue object and corresponding read-only queue and write-only queue.

In an operation 1018, subscription services are initialized for the nozzle instance. For example, a subscription capability is initialized to each project of the one or more projects 602 of ESPE 600 based on the request from event client system 800.

In an operation 1020, a subscriber thread is created and started that is dedicated to receiving events 414 from ESP device 104 for handling by the nozzle instance. The subscriber thread is started for the subscription connection to ESPE 600. The initialized subscription services are started for the subscriber thread. To start the subscriber thread and the initialized subscription services, a port number is provided. For example, the request from event client system 800 may include a host name of ESP device 104 and the port number to establish a subscription connection to ESPE 600.

Referring to FIG. 10*b*, operations 1040 to 1058 are executed by the started subscriber thread. Each nozzle instance runs a loop on its subscriber thread that may consume all available central processing units (CPUs) for the thread or that may be throttled to limit the consumption of available CPUs by the nozzle. The throttling can be configured by a user such as a system administrator by defining a period of time for the subscriber thread to sleep before beginning a new cycle of its work loop. By default, the sleep time is zero so that the subscriber thread consumes as much processor time as allowed. Throttling increases a latency of event delivery, but allows stream processing system 100 to handle more event streams.

In an operation 1040, an event block of events 414 is received by the started subscriber thread from ESPE 600. As discussed previously, the event block includes a unique identifier of a type of event and the subscriber thread of the nozzle instance is configured to process the event block based on a media type of the type of event indicated by the unique identifier.

In an operation 1042, an event object is selected from the received event block that may contain one or more event objects. Each event object in the received event block has an event schema of events schemata 814 and a key that is unique across representation part space 714.

For example, a symbol for a commodity can be a key for a current price of the commodity on a market. Keys can also be compound. Client systems that wish to render multi-dimensional displays of values can utilize compound keys. For example, a plane on a client can display a 3D heat map where each vertex expresses two current social media quantitative values, such as interactivity level and predilection to buy a certain type of service, in aggregate at the intersection of two dimensions, such as household income and education level. One quantitative level is expressed as the z-value for each plane vertex, where the x and y values of the vertices represent the two dimensions. The event key could be a compound key of the two dimensions, household income and education level.

In an operation 1044, the selected event object is written to the write-only queue. For example, nozzle 1 718*a* writes the selected event object to write-only queue 1101*a* with a change index value.

In an operation 1046, a change index value is incremented so that a unique value is associated with each received event object. The change index value for a new incoming event object is one greater than the last change index value for the event stream. To maximize incoming throughput, event objects are not checked to see if they are redundant at this point—two events with the same key may exist in the write-only queue.

In an operation 1048, a determination is made concerning whether or not the received event block includes another event object. If the received event block includes another event object, processing continues in operation 1042 to select the next event object from the received event block and write the next event object to the write-only queue. If the received event block does not include another event object, processing continues in an operation 1050.

In operation 1050, a determination is made concerning whether or not a request to drain the queue has been received as discussed further below. If a request to drain the queue has been received, processing continues in an operation 1052. If a request to drain the queue has not been received, processing continues in operation 1040 to continue accumulating event block objects onto the write-only queue, such as write-only queue 1101*a*.

In operation 1052, the read-only queue is cleared. For example, read-only queue 1102*a* is cleared.

In an operation 1054, the write-only queue, such as write-only queue 1101*a*, is blocked.

In an operation 1056, the queue object, such as queue object 1100a, toggles read-only queue 1102a and write-only queue 1101a by making the current write-only queue 1101a, read-only queue 1102a and by making the cleared read-only queue 1102a, the current write-only queue 1101a. For example, the values of "readOnlyQueue" member 1220 and "writeOnlyQueue" member 1222 are switched.

In an operation 1058, the current write-only queue 1101a is unblocked and processing continues in operation 1040 to continue accumulating event block objects onto the write-only queue, such as write-only queue 1101a that was previously read-only queue 1102a before the toggle or switch.

Referring again to FIG. 10a, in an operation 1022, a rendering thread is started for the nozzle instance. Referring to FIG. 10c, operations 1060 to 1084 may be executed by the started rendering thread. The rendering thread is dedicated to processing received events stored, for example, in write-only queue 1101a.

In an operation 1060, the request to drain the queue is sent to the subscriber thread. For example, the request to drain the queue is sent when nozzle 718a asks queue object 1100a for access to read-only queue 1102a.

In an operation 1062, the rendering thread acquires a write-only tree map. For example, referring to FIGS. 11 and 12, the rendering thread of nozzle 1 718a acquires a write-only rendered event tree map 1106 using "writeOnlyTreeMap" member 1216.

In an operation 1064, an event object is read from the read-only queue. For example, the rendering thread of nozzle 1 718a reads from read-only queue 1102a, which was just toggled from write-only queue 1101a and contains the event objects received since the last request to drain the queue was sent in operation 1060.

In an operation 1066, the rendering thread renders the read event object from the read-only queue into its representation form, such as a JSON snippet. For example, nozzle 1 718a renders the read event object based on the event type of the event object using "renderEvent" method 1204 according to the rules of the event schema for the nozzle's media type. The event schema is a definition that is encompassed in the definition of the overall media type. For example, an event object may have an event schema that defines five named values that are a mix of numeric and character types. Such an event can be rendered as a JSON array. Representation part space 714 for such events can be rendered as an array of arrays. An additional JSON object can specify the names common to the values of all of the events. An event schema can be shared across more than one media type.

An event type is a data structure native to a programming language. It can be sent to resource server 106 in any number of formats, including binary formats specific to the programming language used. In a system that needs to minimize latency, the original event type may be binary and optimized for minimal travel time from the original source, such as a sensor. To reach requesting event client system 800 that is a web browser, compressed JSON may be the best data structure format because web browsers are optimized to handle input as JSON after the text has been decompressed. Sending binary data to the web browser may be more optimal, but the binary data is transformed into Javascript native data structures by a Javascript interpreter. JSON, on the other hand, is already native to Javascript. Thus, transforming the event from a programming language data type to a JSON data type may be performed by the nozzle to ensure optimized transfer of an event object from a source, through analytics, and to requesting event client system 800 that is a web browser.

In operation 1068, a determination is made concerning whether or not the event object includes a new key. If the event object includes a new key, processing continues in an operation 1070. If the event object does not include a new key, processing continues in an operation 1074.

In operation 1070, the rendering thread allocates a character buffer in representation part space 714 and identifies a pointer to the allocated character buffer when JSON objects are used to represent the event. The buffer may include other data types based on the media type definition of the event type of the event object.

In an operation 1072, a reference to the allocated character buffer is added to the write-only tree map such as write-only tree map 1106a.

In operation 1074, the rendering thread stores or updates the rendered event in the allocated character buffer in representation part space 714. The allocated character buffer is updated when the event object does not include a new key. Redundant events in the queue are not included in the write-only tree map because only the last event object for a particular event key is added to the write-only tree map.

In an operation 1076, the change index value associated with the allocated character buffer is updated to the change index value associated with the event object read in operation 1064. The most recent event object representation in the write-only tree map can be indexed by both the event key and the change index.

In an operation 1078, a determination is made concerning whether or not the read-only queue includes another event object. If the read-only queue includes another event object, processing continues in operation 1064 to select and render the next event object from the read-only queue. If the read-only queue does not include another event object, processing continues in an operation 1080.

A read-only tree map is also created by each nozzle within third computer-readable medium 708. For example, referring to FIGS. 11 and 12, the rendering thread of nozzle 1 718a can also create and acquire a read-only tree map 1108a using "readOnlyTreeMap" member 1214. After the concrete nozzle has rendered a representation part for each event in the read-only queue, such as read-only queue 1102a, control returns to the abstract nozzle to commit write-only tree map 1106a.

Referring again to FIG. 10, in an operation 1080, the rendering thread blocks incoming requests to the write-only tree map. In an operation 1082, the rendering thread toggles, for example, read-only tree map 1108a and write-only tree map 1106a by making the current write-only tree map 1106a, read-only tree map 1108a and making the cleared read-only tree map 1108a, the current write-only tree map 1106a. For example, the values of "readOnlyTreeMap" member 1214 and writeOnlyTreeMap" member 1216 are switched. This process may be referred to as "committing" write-only tree map 1106a.

In an operation 1084, the write-only tree map is unblocked and processing continues in operation 1060 to commit the next event objects to the write-only tree map. Read-only tree map 1108a is now ready to service requests from request dispatcher 822 for ordered lists of events.

As discussed earlier, the committing occurs as the last step of taking the events in the read-only queue and putting them in the write-only tree map based on their keys. The committing is a function of how quickly events are coming into the read-only queue and how long it takes to put all of them into the write-only tree map. While committing is taking place, events continue to queue in the write-only queue. Operations 1040-1084 handle a great deal of the work of publishing events 414 that is typically handled by a requestor thread while minimizing the blocking of both incoming event receipt and requests from the requestor thread. While only one nozzle may be the writer for any particular write-only tree map, multiple nozzles of nozzles 718 may write and commit rendered events to multiple write-only tree maps.

Referring again to FIG. 10a, in an operation 1024, a requestor thread is acquired from a pool of threads that may have been created when the response assembler was instantiated.

In an operation 1026, one or more rendered event objects that are responsive to the received request may be selected by the requestor thread. For example, response assembler 720 requests a list of keys from the read-only tree map whose representation parts have changed since the last change index that the requesting event client system 800 received and that was identified in the request. An example requesting event client system 800 can provide filter parameters in the request that exclude representation parts by criteria related to the key. For example, a viewer type of requesting event client system 800 may determine that certain representation parts would never be rendered because they are outside a clipping region so clipping region identification information is included in the request as a filter.

In an operation 1027, a determination is made concerning whether or not an existing compressed block exists that includes the one or more rendered event objects that are responsive to the received request. If an existing compressed block exists that includes the one or more rendered event objects that are responsive to the received request, processing continues in operation 1030. If an existing compressed block exists that includes the one or more rendered event objects that are responsive to the received request, processing continues in an operation 1028.

In an operation 1028, the selected one or more rendered events are read from the representation part space 714 using the references identified from the read-only tree map. Response assembler 720 requests each representation part in the ordered list from the read-only tree map that is current at the time of the request using a key included in the request to lookup the reference to the allocated character buffer in which the key's data is stored. In assembling the representation, requests may be made against multiple read-only tree maps as the rendering thread may be toggling the write-only and read-only tree maps in operation 1082 while the response is being assembled. The media type can optionally define a change index field for each representation part so that a client can sort the representation parts by change indices.

This design allows resource server 106 to work with fixed memory while maintaining low latency to support UI clients that make figurative displays from high data volume that is quickly changing. For example, requesting event client system 800 may render thousands or even millions of data values each second.

In an operation 1029, the read one or more rendered events are compressed, optionally encrypted, and stored in third computer-readable medium 708 for potential reuse.

Response assembler 720 defers to the nozzle instance for the compression, encryption, and concatenation of representation parts. For example, for a JSON based media type that encodes the event space as an array of arrays, the nozzle instance handles the placement of a comma between arrays.

Blocks of compressed representations of the rendered events may be stored in third computer-readable medium 708. For example, the compression may follow the gzip standard, which is the prevalent compression standard for the Internet. Gzip blocks are 32 kilobytes or less in size. A compression optimizer module may be included as a subcomponent of response assembler 720. The compression optimizer module determines how to make new compressed blocks of the right level of compression. The correct level of compression is a balance between having large blocks that compress better and smaller blocks that are less likely to be invalidated by the arrival of a new event. The compression optimizer module, which can be plugged in, can use static settings for optimal and mandatory block sizes or can derive them using knowledge of the event content, observation of actual data compression, etc. If the compression optimizer module knows that the space of possible event values is small, a smaller dictionary results, which can extend across larger blocks. Conversely, a larger space could mean that smaller blocks would work better. If the compression optimizer module detects or is told that a large portion of an event space is slowly changing, that part of the representation can be compressed in a larger set of blocks. Beyond what can be detected or known based on data structure, the compression optimizer module can also observe how well the data is compressing and experiment on different block sizes until better compression is achieved.

The compression optimizer module also balances compression optimization with inbound event throughput. On a busy system, many requests may come in between commits of the write-only tree map. While initializing event client systems may need to retrieve all of the rendered events stored in representation part space 714, most of event client systems 108 will have already started polling and only need changes that have not yet been seen by that event client system.

To prevent duplicate work in compressing the data, compressed blocks may be re-used in a lazy fashion. An incoming request uses an available compressed block, if available. If not available, a new compressed block is simultaneously written to the output stream and to a new compressed block which is then available for re-use.

Figure 13:
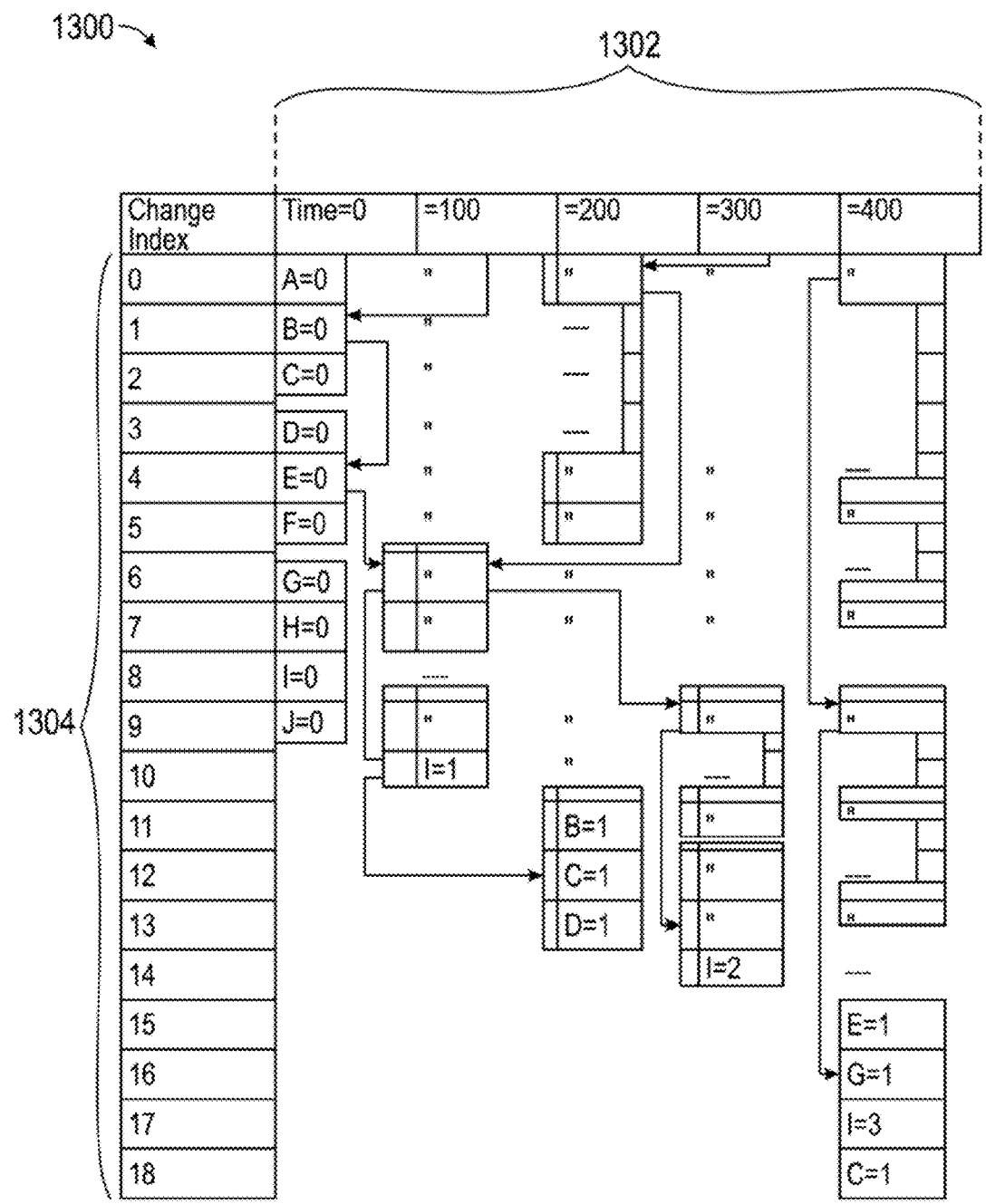
FIG. 13 illustrates reuse of compressed blocks in accordance with an illustrative embodiment.

FIG. 13 illustrates reuse of compressed blocks by response assembler 720 and provides an example time table 1300 with 10 event objects with keys A-J, an optimum block size value of 2 or 3, a minimum size value of 2, and a maximum size value of 4. Typically, the optimum, minimum, and maximum block sizes are much, much greater, such as on the order of hundreds or even thousands. Columns 1302 of time table 1300 show commit times of 0 millisecond (ms), 100 ms, 200 ms, 300 ms, and 400 ms for illustration. Rows 1304 show values of the change index. Each table cell shows a key and a current value based on receipt of an event block of events 414 that includes a new value as indicated or a double-quote that indicates that the value associated with the key did not change in the received event block. When a new event comes in, the event is replaced in the write-only tree map and the change index is updated as described in FIGS. 10b and 10c.

The compression optimizer module begins with knowledge of the number of representation parts, or unique keys. On the initial creation of blocks, all of the blocks may be the optimum size until the end of the list. The final block can be created such that it is within the minimum size value and the maximum size value. On subsequent passes, the index of the next block is compared to the next keys in the list. If they don't match, the block is invalidated. Each mismatch is one less representation part in a new block. When there are so many mismatches that the minimum size has been reached, a new block is created. When the reconstruction of the invalid block completes, the index of the next block is used, and the process repeats.

Blocks tend to get smaller until they reach the minimum size and are then combined. Response assembler 720 can combine blocks between optimum and minimum size on a pass at the cost of adding latency of event delivery when adjacent blocks whose contents can be combined into optimum or near-optimum size, regardless of whether the contents need to be updated. The content of the adjacent blocks are copied to the new block, and the old blocks are deleted. The near-optimum range can be configured by a system administrator, with a range of 0 tuning the behavior.

The range can also be computed. One possible way to compute the range is to observe the time cost of sending smaller blocks that are less compressed versus optimally sized blocks and comparing that time cost to the latency introduced by taking the time to combine blocks.

Referring again to FIG. 13, at commit time 100, a first block includes the value of keys "A", "B", and "C", a second block includes the value of keys "D", "E", and "F", and a third block includes the value of keys "G", "H", "I", and "J". The first, second, and third blocks are valid after commit time 0.

At commit time 100, a single new event object was received and processed. The value of key "I" is changed from zero to one. The change index 8 is no longer valid, and the block that includes "I" is invalidated even though the value of keys "G", "H", and "J" have not changed.

The arrows between cells illustrate the blocks that a new event client system of event client systems 108 receives when connecting and sending 'changes since 0' after commit time 100 and before commit time 200. The first block that includes keys "A", "B", and "C", and the second block that includes keys "D", "E", and "F" blocks are re-used, while two new blocks are generated. A fourth block is created that contains only keys "G" and "H", even though those values haven't been changed. A fifth block is created that contains keys "J" and "I", even though only key "I" has changed. The first, second, fourth, and fifth blocks are valid after commit time 100.

After commit time 200 and before commit time 300, keys "B", "C", and "D" changed, which results in two new blocks, and the re-use of two blocks. A sixth block is created that contains keys "A", "E", and "F" so that the block has an optimal size of 3 and includes the unchanged keys. The fourth block and the fifth block can be re-used. A seventh block is created that contains keys "B", "C", and "D". The fourth, fifth, sixth, and seventh blocks are valid after commit time 200.

After commit time 300 and before commit time 400, only key "I" has changed. This invalidates the fifth block. Key "J" must be combined in a block with another value or it will be in a block with less than the minimum size. An eighth block is created that contains keys "J" and "B" because "B" is in the last created block and achieves the minimum size value. This invalidates the seventh block. A ninth block is created that contains keys "C", "D", and "I".". The fourth, sixth, eighth, and ninth blocks are valid after commit time 300.

After commit time 300, all of the blocks are invalidated because a value changed in the sixth block—key "E", the fourth block—key "G", the eighth block—key "I", and the ninth block—key "C".

The polling rate may be non-deterministic so that each event client system 800 of event clients systems 108 can have a different request rate. For example, four different event client systems of event clients systems 108 initiate at commit time zero, but each can make their next call at a different time. Each would ask for "changes since 9", but each receives a different response based on the time of the request. If the requests are received at times 150 ms, 250 ms, 350 ms, and 450 ms, respectively, the fastest client, client 1, would make its next request as 'changes since 10'. If its rate holds constant, it would come in at time 300 and make the request 'changes since 14'. The slowest client would make its next request as 'changes since 9' and its subsequent request as 'changes since 18'.

In general, client requests other than initial requests will not align with block boundaries such that the first block almost always need to be generated in an ad-hoc manner. Memory permitting, the initial ad-hoc block can be stored, for example, in third computer-readable medium 708, for possible re-use by other client requests that make exactly the same request during the same commit time period.

Resource server 106 may not guarantee delivery of any particular event to any particular client system of event clients systems 108, nor does resource server 106 guarantee delivery of a particular event to a particular client system. An event client system of event clients systems 108 is less likely to receive all events when representation part space 714 is changing more rapidly and/or the event client system is polling less frequently.

The event flow is expected to be non-deterministic. Representation part space 714 can change more frequently than any event client system of event clients systems 108 polls for changes. Each event client system 800 of event clients systems 108 can be expected to have widely varying refresh rates due to networking speeds, processing speeds and other factors. For a particular event client system 800, a particular event could be:

written to representation part space 714 and assembled as part of the response to event client system 800.

written to a representation part space 714, but never requested by event client system 800 before being replaced by a new identically keyed event value.

not written to representation part space 714 because the rendering thread ignores the event due to the existence of a newer identically keyed event. Redundant events are overwritten by the identically keyed latest arriving event prior to committing write-only tree map 1106*a* for reading by requestor threads.

written to representation part space 714, but never requested by event client system 800 because event client system 800 stopped sending requests.

In some cases though, the event stream is slow enough and the event client systems of event client systems 108 are fast enough such that each event client system 800 receives responses for all events.

A RESTful caching intermediary may hold a cached copy of rendered events, but a fast moving stream means less caching unless there is a very large number of clients. The resource that is being requested is 'changes since last event index N', and different event client systems of event client systems 108 likely request and process rendered events at different rates. When N is the same and within a small timeout window, the cache copy may be used.

For any particular commit, the efficiency of compression block re-use is dependent on the events that are received. For example, the commit at commit time 400 invalidates every block. Smaller block sizes are better for re-use because a block is less likely to be invalidated. But gzip compressed blocks are better compressed if they are larger, dependent on the data.

Optionally, resource service application 712 can persist each rendered event that has had at least one request at the cost of some dedicated processor time, possibly consuming entire processors; increased memory usage to store representation part space 714; possibly increased latency of streaming events; greater system complexity; and compression minimization.

In an operation 1030, a response 1110 (shown with reference to FIG. 11) is created from the stored compressed read one or more rendered events. Response assembler 720 may combine the selected compressed blocks and possibly data directly from read-only tree map 1108a. Response assembler 720 may merge the representation of events with template content. Template content includes generally static information sent initially to the requesting event client system 800 from event publishing systems 102. One example of a template is a diagnostic template versus an optimized template. The diagnostic template substitutes in diagnostic values such as queue lengths and a duration of a response assembly at an end of the representation, while the optimized template does not. Other templates may include differing links to other resources where the links are global to the resource and not specific to individual events.

In an operation 1032, the response that includes one or more compressed blocks is sent to response handler 820 executing at event client system 800 that originated the received request. For example, the requesting event client system 800 is sent response 1110 over HTTP or HTTPS after being compressed as discussed previously. When response 1110 is received, response handler 820 hands individual events to an event feed that may send the events to an object model. The object model updates values. The next time a renderer at event client system 800 is called, the updated values may be rendered by the GPU of event client system 800.

In an operation 1034, the started requestor thread is inactive and is returned to the pool of threads.

In an operation 1036, a determination is made concerning whether or not processing is stopped. If processing is not stopped, processing continues in operation 1004 to continue receiving requests for resources. If processing is stopped, processing continues in an operation 1038. In operation 1038, the connection made between resource service application 712 and ESPE 600 is disconnected, the started threads are stopped, etc.

Any type of event client system that is tolerant of a non-deterministic stream can utilize resource server 106. Resource server 106 can be used to provide a real-time, detail-oriented, highly figurative interactive view of a data stream using video game technologies and techniques, including 3D graphics in HTML5 web browsers using WebGL and immersive virtual reality. A UI event client system purposed for presentation of information to human users at frame-rate are naturally tolerant of a non-deterministic stream. Poller 818 and a renderer of event client system 800 can be thought of as two gears working in concert to get events to the human eye.

A DataWorld is a world made out of data. The techniques of gaming and virtual worlds are utilized to afford new ways of perceiving data. In appearance and functionality, a DataWorld is most similar to virtual worlds, but the DataWorld concept overlaps with that of a virtual world rather than being a type of virtual world.

The renderer presents a high-throughput stream with highly interactive, 3D techniques common to gaming based on receipt of responses 1110. Sensors that provide data 324 need not be physical sensors—they can be 'software sensors' embedded in operational software systems such as an e-commerce web site, a firewall or real-time fraud detection system, etc.

For example, the renderer may present a visual presentation of data 324 (received in responses 1110) that is somewhat similar to an office window looking out onto a factory floor. The elements that contain sensors may be arranged relative to an XZ plane, just as the factory floor is an XZ plane. Real-time analytics are displayed in a manner similar to augmented reality. The data values are connected to and contextualized by the graphic elements, which are presented using virtual world techniques. Users explore their DataWorld by navigating a camera in 3D, selecting elements and value ranges for emphasis, and varying the UI between broad situational awareness and focus on specific details.

Users bind an instance of their DataWorld to a particular stream by selecting a stream URI and mapping the stream metadata to visual elements. The visual elements are bound to image URIs, for example, high-contrast low-detail technical diagrams that illustrate the locations of individual sensors.

Each graphical object of the UI event client system may have a single event rendering thread, but an overall object graph does not necessarily need to be consistent. Thus, the UI event client system can include multiple event rendering threads that can consume an entire processor or that can share processors. For any sub-graph that must be consistent, all objects in such a sub-graph share a single event rendering thread. Feeder threads can pipeline object state changes. Feeder threads can act as single event rendering threads on any streaming objects.

The DataWorld can include:
The high-throughput data stream from resource server 106.
2D and 3D descriptive artifacts that map to different levels of the networks and that describe categorically a type of level. For example, a system may have a level, pumps, and several different types of pumps. Each different type of pump has its own 2D technical diagram and border color for differentiation from the other pumps.
The mapping definition of network elements underlying the artifacts. For example, the same kind of pump could be used for different flows. Each flow is a network of pumps, pipes and other elements. Each flow has a mapping definition.
Value objects: 3D objects and 2D objects that express values. A bar chart is an expressive 2D value object. A surface plot is an expressive 3D object. A descriptive artifact could also be expressive. For example, parts of either a 2D or 3D artifact could light up in response to an event meeting a business rule.
Connectors that connect the descriptive objects to the value objects, and connect value objects to other value objects.
An event schema that provides values and identities so that the values can be associated with one or more elements.
A 3D scene that includes any number of value objects, descriptive artifacts, and connectors.
A descriptive space and a value space for holding descriptive artifacts and value objects. The spaces can overlap.
A frequently-refreshing mapping that determines the 3D position of all of the objects in the scene.

A camera for viewing a frustum, a region of the system. The frustum is the field of view of the camera for the camera's current position, direction and focus. As the camera's attributes change, the frustum captures different regions of the scene.

Vantages comprised of camera position, camera target, and any other relevant aspects of the scene, including opacity or color attributes of subsets of objects.

Intelligent modules, including users or computer application code, that frequently update any aspect of the scene and camera.

Localization of string labels can be approached in one of several ways depending on the characteristics of labels for the data. First, the localized labels can simply arrive in the event payload, and no localization is required. The nozzle passes them on as if they were any other data. This approach has the disadvantage of possibly repeatedly sending the same label data over and over. For a label heavy system, this may affect performance.

Alternatively, a bundle of localized string labels can be its own resource or resources that the event client system accesses prior to needing any labels. The labels are referenced with keys that are known to the event producer. The nozzle passes the keys along, which are matched to labels by requesting event client system 800. This works when all possible labels that requesting event client system 800 may need are known beforehand and there are a relatively small number.

Another option is to involve the nozzle in providing the labels during processing. When encountering a field that is designated as a label field, the concrete nozzle defers to the abstract nozzle to ensure that a link to a resource containing the correct label for the language used by requesting event client system 800 is provided in the representation. Requesting event client system 800 can access the resource containing localization if it does not already have the resource or, if it has a stale copy, in accordance with the rules of HTTP.

By utilizing event processing system 100, events from data streams can modify arbitrary geometries that are developed in an ad hoc fashion. A developer can create a media type that best fits the new geometry along with the graphics coding to render the geometry across different graphics platforms, including fully immersive VR headset environments, broadly available web browsers supporting WebGL and any other high performance 2D or 3D graphics rendering technology. The nozzle takes care of translating the event to media type representation parts and the rest of the system ensures low latency and scalability to an unbounded number of users.

For example, a DataWorld can consist of an unbounded number of polyhedrons that each express n dimensions with spikes originating from the center. Each polyhedron is grouped into one space of an unbounded number of spaces and positioned along relative XYZ coordinates in that space. Each space is positioned by XYZ coordinates relative to the parent space. Spaces can recurse until the absolute space of the graphics renderer is reached. The polyhedrons can be connected with lines that cross spaces. An orthogonal surface can cross the spaces. The relative Z value of each vertex represents the value of the XY pair.

On the event side, each polyhedron spike could represent a normalized value for a category of a business object, such as an account. The hierarchy of geometric spaces mirrors a hierarchy of accounts, such as the management hierarchy of a financial institution's organization serving the accounts. The position in relative space is an additional 3 dimensions for each account, such as account lifespan, fraud propensity score, and current value of account assets. The orthogonal plane shares the Y axis, fraud propensity score, and indicates a granular likelihood based on history for the score at a particular spot in space. The connections between polyhedrons represent active business between the accounts.

This system has a nozzle, a media-type, and a stream for:
account characteristics represented by the spiky polyhedrons,
position and scale of spaces, and
a predictive orthogonal plane The event type of the first can be a data structure with characteristic name and account id. The media type can be JSON: {"space":"accountTeamJ", "objId":"account41101913441", "accountIrregularityScore":0.3423}

The media type is designed like this so that the graphics rendering client can easily map to the space id and to the object. The nozzle handles the space lookup, which the originating event stream has no knowledge of.

The other geometries and media-types work similarly. The client follows links in the RESTful hypermedia as the engine of application state (HATEAOS) style and follows links to the representation of each stream, effectively rotating between them. For another example, the media type for the predictive orthogonal plane could be: {"lifespanDays": 59,"curAssetVal":6493482,"space":"accountTeamJ","projected PropensityFraudValue",0.253}

Figure 14:
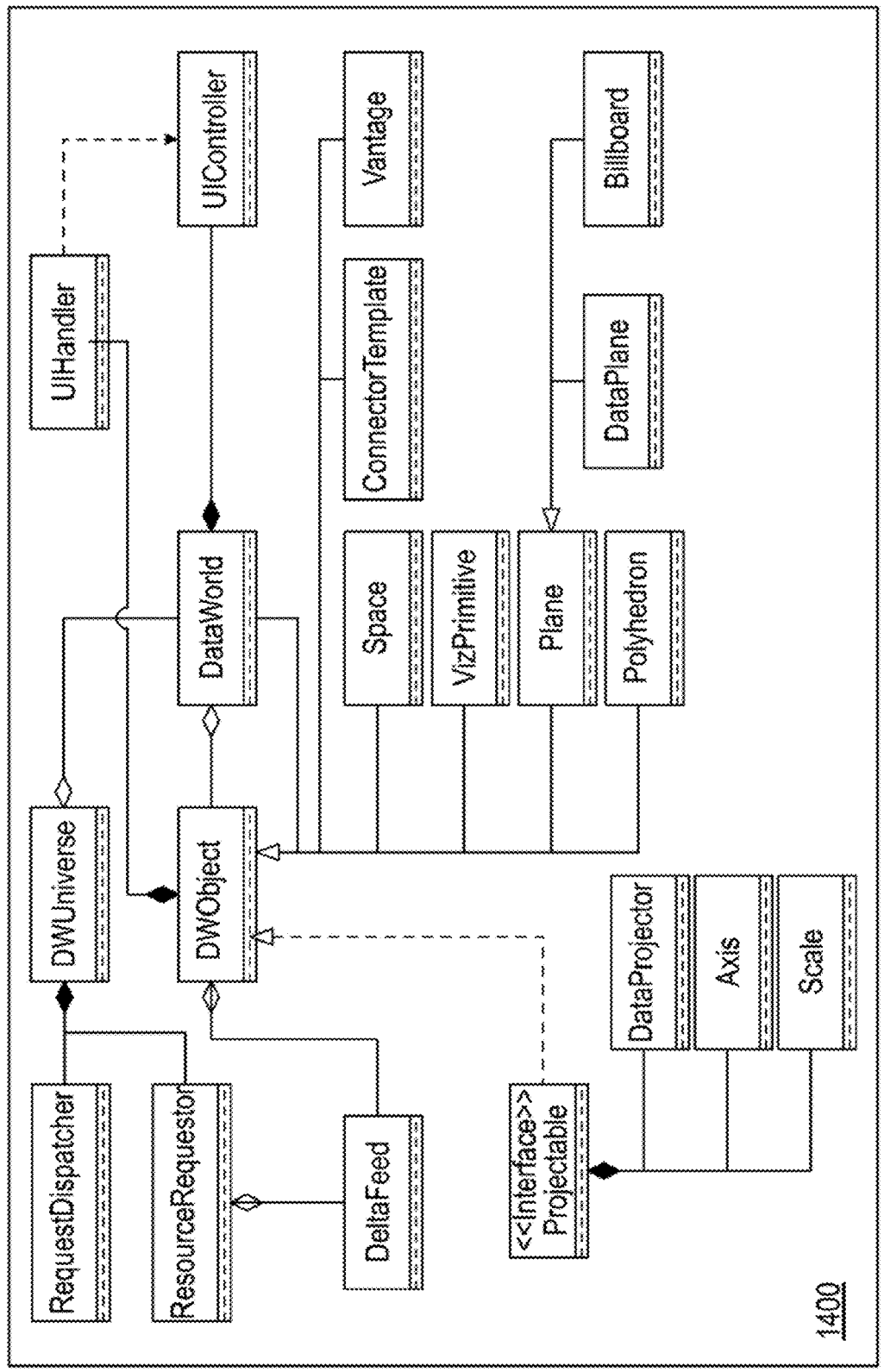
FIG. 14 depicts a unified modeling language diagram of the event client system of FIG. 8 in accordance with an illustrative embodiment.

Referring to FIG. 14, a DataWorld client can utilize a scheme 1400 as illustrated in the unified modeling language (UML) diagram. DWUniverse is a top level client object that allows for aggregation of separately defined DataWorlds. Each DataWorld is a resource which is fetched via a ResourceRequestor. A RequestDispatcher handles the polling of the resources as well as the ordering and timing of requests. The DataWorld is one of several realizations of DWObject. Other realizations of DWObject are Space, VizPrimitive, Plane, and Polyhedron. Space represents a coordinate system relative to a parent. VizPrimitive is an arbitrary 3D object that may have been created using a 3D modeling tool. Plane is an object that may be data driven, in which case it is a DataPlane, or which could be a Billboard that renders static content including text.

DWObjects are all realizations of a Projectable interface. These projectable realizations have one or more Axes, a Scale, and a DataProjector that maps from business values to geometric values.

A ConnectorTemplate defines connections between objects. A Vantage defines a position in space as well as a direction and field of view of the camera.

UIHandlers are attached to each DWObject and know how to translate a UI event to an actionable event that modifies one or more objects in the view in some manner. The modified objects need not include the target object. A UI Controller dispatches events to UIHandlers.

Some aspects of the described embodiments may utilize the Internet of Things (IoT), where things (e.g., machines, devices, phones, sensors) can be connected to networks and the data from these things can be collected and processed within the things and/or external to the things. For example, with the IoT there can be sensors in many different devices, and high value analytics can be applied to identify hidden relationships and drive increased efficiencies. This can apply to both Big Data analytics and realtime (streaming) analytics.

In an augmented reality (AR) DataWorld, the view could be across a factory floor with various real-time metrics floating above equipment indicated on the factory floor in 3D space. Alternatively, the view could be across a retail space that shows consumer traffic patterns and inventory turnover. The physical space being viewed may use IoT via sensors and computer vision. Streams of data from the IoT are analyzed, condensed, and fed back, for example, to AR glasses to augment reality analytically.

In an augmented virtual reality DataWorld, reality has not just the physical reality in front of a spectator. There are many realities, and the physical world can be a hindrance in discovering the most important meanings. Instead of the physical layout of the factory floor defining the view, it may be more informative to see the layout of flows and signals between the equipment. For such cases, augmented virtual reality may better suit user needs—especially when the connected equipment is spread across the globe, or the interesting objects exist only in an n-dimensional cyberspace. The DataWorld is virtual reality augmented with analytics. Take the factory equipment, represent the objects and their connections in virtual reality in any arrangement desired and augment it with data visualizations. The real-time data visualizations follow any rearrangement.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop®, for example, is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session. Some systems may be of other types, designs and configurations.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. serving data resources from a publishing system to a client system The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   receive a block of streamed data, wherein the block includes a value associated with an event and a unique identifier of the event;
   select a pre-allocated block of memory, wherein the pre-allocated block of memory includes one or more previously compressed blocks, wherein each of the one or more previously compressed blocks includes an associated value and a different unique identifier;
   compress the received block with the one or more previously compressed blocks to create a new compressed block;
   store the new compressed block in the selected pre-allocated block of memory, wherein a reference to the selected pre-allocated block of memory is stored in a tree map based on the unique identifier;
   receive a second block of streamed data, wherein the second block includes a second value associated with the event and the unique identifier of the event, wherein the second value is different from the value;
   identify the pre-allocated block of memory from the tree map using the unique identifier;
   read the received block and at least one of the one or more previously compressed blocks from the identified pre-allocated block of memory;
   select a second pre-allocated block of memory;
   compress the received second block with the at least one of the one or more previously compressed blocks to create a second new compressed block;
   store the second new compressed block in the selected second pre-allocated block of memory, wherein a reference to the selected second pre-allocated block of memory is stored in the tree map based on the unique identifier;
   receive a request for an update for the event based on the unique identifier from a requesting event client system; and
   send the stored, second new compressed block to the requesting event client system.

2. A computing device comprising:
   a processor; and
   a computer-readable medium operably coupled to the processor, the computer-readable medium having computer-readable instructions stored thereon that, when executed by the processor, cause the computing device to
   receive a block of streamed data, wherein the block includes a value associated with an event and a unique identifier of the event;
   select a pre-allocated block of memory, wherein the pre-allocated block of memory includes one or more previously compressed blocks, wherein each of the one or more previously compressed blocks includes an associated value and a different unique identifier;
   compress the received block with the one or more previously compressed blocks to create a new compressed block;
   store the new compressed block in the selected pre-allocated block of memory, wherein a reference to the selected pre-allocated block of memory is stored in a tree map based on the unique identifier;
   receive a second block of streamed data, wherein the second block includes a second value associated with the event and the unique identifier of the event, wherein the second value is different from the value;
identify the pre-allocated block of memory from the tree map using the unique identifier;
read the received block and at least one of the one or more previously compressed blocks from the identified pre-allocated block of memory;
select a second pre-allocated block of memory;
compress the received second block with the at least one of the one or more previously compressed blocks to create a second new compressed block;
store the second new compressed block in the selected second pre-allocated block of memory, wherein a reference to the selected second pre-allocated block of memory is stored in the tree map based on the unique identifier;
receive a request for an update for the event based on the unique identifier from a requesting event client system; and
send the stored, second new compressed block to the requesting event client system.

3. A method of serving data resources from a publishing system to a client system, the method comprising:
receiving a block of streamed data, wherein the block includes a value associated with an event and a unique identifier of the event;
selecting, by a computing device, a pre-allocated block of memory, wherein the pre-allocated block of memory includes one or more previously compressed blocks, wherein each of the one or more previously compressed blocks includes an associated value and a different unique identifier;
compressing, by the computing device, the received block with the one or more previously compressed blocks to create a new compressed block;
storing the new compressed block in the selected pre-allocated block of memory, wherein a reference to the selected pre-allocated block of memory is stored in a tree map based on the unique identifier;
receiving a second block of streamed data, wherein the second block includes a second value associated with the event and the unique identifier of the event, wherein the second value is different from the value;
identifying, by the computing device, the pre-allocated block of memory from the tree map using the unique identifier;
reading, by the computing device, the received block and at least one of the one or more previously compressed blocks from the identified pre-allocated block of memory;
selecting, by the computing device a second pre-allocated block of memory;
compressing, by the computing device, the received second block with the at least one of the one or more previously compressed blocks to create a second new compressed block;
storing the second new compressed block in the selected second pre-allocated block of memory, wherein a reference to the selected second pre-allocated block of memory is stored in the tree map based on the unique identifier;
receiving a request for an update for the event based on the unique identifier from a requesting event client system; and
sending, by the computing device, the stored, second new compressed block to the requesting event client system.

* * * * *